United States Patent
Mutagi et al.

(10) Patent No.: US 12,014,117 B2
(45) Date of Patent: *Jun. 18, 2024

(54) GROUPING DEVICES FOR VOICE CONTROL

(71) Applicant: Amazon Technologies, Inc., Seattle, WA (US)

(72) Inventors: Rohan Mutagi, Redmond, WA (US); He Lu, Bothell, WA (US); Willy Lew Yuk Vong, Seattle, WA (US); Michael Dale Whiteley, Redmond, WA (US); Fred Torok, Mercer Island, WA (US); Shikher Sitoke, Seattle, WA (US); David Ross Bronaugh, Seattle, WA (US); Bo Li, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/301,703

(22) Filed: Apr. 12, 2021

(65) Prior Publication Data

US 2021/0326103 A1    Oct. 21, 2021

Related U.S. Application Data

(63) Continuation of application No. 16/042,389, filed on Jul. 23, 2018, now Pat. No. 10,976,996, which is a
(Continued)

(51) Int. Cl.
*G06F 3/16*      (2006.01)
*G10L 15/02*     (2006.01)
(Continued)

(52) U.S. Cl.
CPC .............. *G06F 3/167* (2013.01); *G10L 15/02* (2013.01); *G10L 15/18* (2013.01); *G10L 15/22* (2013.01);
(Continued)

(58) Field of Classification Search
None
See application file for complete search history.

(56) References Cited

U.S. PATENT DOCUMENTS 5,086,385 A * 2/1992 Launey ............... G06F 3/04847
                                                      700/83
5,307,295 A    4/1994 Taylor et al.
(Continued)

OTHER PUBLICATIONS

Bendersky, "Finite State Machines and Regular Expressions", Retreived from <<http://www.gamedev.net/page/resources/_/technical/general-programming/finite-state-machines-and-regular-expressionsr3176>>, GameDev.net, Jun. 2013, 31 pages.
(Continued)

*Primary Examiner* — Jonathan C Kim
(74) *Attorney, Agent, or Firm* — Lee & Hayes, P.C.

(57) ABSTRACT

Techniques for creating groups of devices for controlling these groups with voice commands are described herein. For instance, an environment may include an array of secondary devices (or "smart appliances", or simply "devices") that are configured to perform an array of operations. Users may request to create different groups of these devices, such that the users may control entire groups at a single time with individual voice commands.

18 Claims, 15 Drawing Sheets

Related U.S. Application Data continuation of application No. 14/752,198, filed on Jun. 26, 2015, now Pat. No. 10,031,722.

(60) Provisional application No. 62/134,465, filed on Mar. 17, 2015.

(51) Int. Cl.
| | |
|---|---|
| *G10L 15/18* | (2013.01) |
| *G10L 15/22* | (2006.01) |
| *G10L 15/26* | (2006.01) |
| *G10L 17/22* | (2013.01) |
| *H04L 12/28* | (2006.01) |

(52) U.S. Cl.
CPC .............. *G10L 15/26* (2013.01); *G10L 17/22* (2013.01); *H04L 12/2816* (2013.01); *G10L 2015/223* (2013.01)

(56) References Cited

U.S. PATENT DOCUMENTS

| | | | |
|---|---|---|---|
| 6,052,750 A | 4/2000 | Lea | |
| 6,653,933 B2* | 11/2003 | Raschke | H04L 67/34 362/233 |
| 6,654,720 B1* | 11/2003 | Graham | G06F 3/16 704/E15.044 |
| 6,725,281 B1 | 4/2004 | Zintel et al. | |
| 6,812,881 B1 | 11/2004 | Mullaly et al. | |
| 6,845,451 B1 | 1/2005 | Anand et al. | |
| 6,930,788 B1 | 8/2005 | Iwamoto et al. | |
| 7,139,716 B1* | 11/2006 | Gaziz | H04L 12/2803 704/275 |
| 7,418,392 B1* | 8/2008 | Mozer | G10L 13/00 315/307 |
| 8,078,290 B2* | 12/2011 | Nelson | G05B 19/042 715/740 |
| 8,116,754 B2* | 2/2012 | Kim | H04W 12/08 455/414.1 |
| 8,176,503 B2 | 5/2012 | Ford et al. | |
| 8,340,975 B1* | 12/2012 | Rosenberger | G10L 15/22 704/274 |
| 8,490,006 B1 | 7/2013 | Reeser et al. | |
| 8,516,087 B2* | 8/2013 | Wilson | H04N 21/4131 709/224 |
| 8,850,346 B2* | 9/2014 | Keenan, Jr. | H04L 9/40 715/771 |
| 9,071,603 B1* | 6/2015 | Frederick | H04L 67/1091 |
| 9,087,514 B2* | 7/2015 | Jonsson | H04L 12/2827 |
| 9,241,257 B1* | 1/2016 | Kim | H04M 1/67 |
| 9,443,527 B1* | 9/2016 | Watanabe | G10L 15/30 |
| 9,554,061 B1* | 1/2017 | Proctor, Jr. | H04S 7/00 |
| 9,680,646 B2* | 6/2017 | Nadathur | H04L 63/0884 |
| 9,875,647 B1 | 1/2018 | Tannenbaum et al. | |
| 10,453,461 B1 | 10/2019 | Mutagi et al. | |
| 2001/0041982 A1 | 11/2001 | Kawasaki et al. | |
| 2002/0129353 A1 | 9/2002 | Williams et al. | |
| 2003/0012168 A1* | 1/2003 | Elson | G01S 5/18 370/400 |
| 2003/0018805 A1 | 1/2003 | Meyerson | |
| 2003/0040812 A1* | 2/2003 | Gonzales | G05B 15/02 700/20 |
| 2003/0103088 A1* | 6/2003 | Dresti | G06F 3/0484 715/835 |
| 2004/0070491 A1 | 4/2004 | Huang et al. | |
| 2004/0267385 A1* | 12/2004 | Lingemann | G05B 15/02 700/83 |
| 2005/0071879 A1* | 3/2005 | Haldavnekar | G06Q 50/00 340/5.5 |
| 2005/0096753 A1* | 5/2005 | Arling | H04L 12/2805 700/11 |
| 2005/0108369 A1* | 5/2005 | Sather | G06F 9/4411 709/220 |
| 2005/0131551 A1 | 6/2005 | Ruutu et al. | |
| 2006/0077174 A1* | 4/2006 | Chung | H04N 21/42204 700/83 |
| 2006/0080408 A1 | 4/2006 | Istvan et al. | |
| 2006/0123053 A1* | 6/2006 | Scannell, Jr. | G06F 16/9577 |
| 2006/0248557 A1* | 11/2006 | Stark | H04N 21/4858 725/74 |
| 2007/0260713 A1* | 11/2007 | Moorer | H04L 67/025 709/220 |
| 2007/0287542 A1 | 12/2007 | Miyazaki et al. | |
| 2008/0037485 A1* | 2/2008 | Osinga | H04L 45/00 370/338 |
| 2008/0064395 A1 | 3/2008 | Sibileau | |
| 2008/0167931 A1 | 7/2008 | Gerstemeier et al. | |
| 2008/0313299 A1* | 12/2008 | Ebbe | H04W 8/26 709/208 |
| 2009/0046715 A1* | 2/2009 | McCoy | H05B 6/688 370/389 |
| 2009/0076827 A1* | 3/2009 | Bulitta | G10L 15/32 704/E11.001 |
| 2009/0204410 A1 | 8/2009 | Mozer et al. | |
| 2009/0316671 A1 | 12/2009 | Rolf et al. | |
| 2010/0104255 A1* | 4/2010 | Yun | H04N 5/765 386/207 |
| 2010/0185445 A1 | 7/2010 | Comerford et al. | |
| 2010/0289643 A1 | 11/2010 | Trundle et al. | |
| 2011/0044438 A1* | 2/2011 | Wang | H04M 11/066 704/E15.005 |
| 2011/0087726 A1 | 4/2011 | Shim et al. | |
| 2011/0190913 A1* | 8/2011 | Van De Sluis | H05B 47/115 700/94 |
| 2011/0193579 A1 | 8/2011 | Wong et al. | |
| 2011/0205965 A1* | 8/2011 | Sprigg | G06F 9/4411 709/201 |
| 2011/0211584 A1* | 9/2011 | Mahmoud | H04L 12/2834 370/401 |
| 2012/0253824 A1* | 10/2012 | Alcantara Talavera | G10L 15/26 704/E21.001 |
| 2013/0010207 A1* | 1/2013 | Valik | G06F 3/0304 704/E21.001 |
| 2013/0038800 A1 | 2/2013 | Yoo | |
| 2013/0052946 A1 | 2/2013 | Chatterjee et al. | |
| 2013/0086245 A1 | 4/2013 | Lu et al. | |
| 2013/0156198 A1 | 6/2013 | Kim et al. | |
| 2013/0162160 A1 | 6/2013 | Ganton et al. | |
| 2013/0183944 A1* | 7/2013 | Mozer | H04L 12/2818 455/414.1 |
| 2013/0188097 A1* | 7/2013 | Smith | H04N 5/00 348/720 |
| 2013/0218572 A1 | 8/2013 | Cho et al. | |
| 2014/0005809 A1* | 1/2014 | Frei | G05B 15/02 700/90 |
| 2014/0032651 A1 | 1/2014 | Singh et al. | |
| 2014/0062297 A1* | 3/2014 | Bora | H05B 45/10 315/297 |
| 2014/0074653 A1 | 3/2014 | Wang et al. | |
| 2014/0082151 A1* | 3/2014 | Chen | H04L 67/025 709/219 |
| 2014/0098247 A1* | 4/2014 | Rao | H04L 67/125 455/420 |
| 2014/0163751 A1* | 6/2014 | Davis | G08C 17/02 700/286 |
| 2014/0167929 A1 | 6/2014 | Shim et al. | |
| 2014/0176309 A1* | 6/2014 | Wang | H04N 21/42222 340/12.5 |
| 2014/0188463 A1 | 7/2014 | Noh et al. | |
| 2014/0191855 A1* | 7/2014 | Kim | G08C 17/02 340/12.54 |
| 2014/0244267 A1* | 8/2014 | Levi | G10L 15/22 704/275 |
| 2014/0249825 A1* | 9/2014 | Proud | A61B 5/681 704/275 |
| 2014/0309789 A1 | 10/2014 | Ricci | |
| 2014/0343946 A1* | 11/2014 | Torok | G10L 15/30 704/270.1 |
| 2014/0349269 A1* | 11/2014 | Canoy | G06N 20/00 434/322 |

(56) References Cited

U.S. PATENT DOCUMENTS

| | | | |
|---|---|---|---|
| 2014/0358553 A1* | 12/2014 | Helmke | G10L 15/22 704/275 |
| 2014/0376747 A1* | 12/2014 | Mullet | G08C 23/00 381/110 |
| 2015/0005900 A1* | 1/2015 | Steele | G05B 19/0426 700/19 |
| 2015/0006742 A1 | 1/2015 | Beals et al. | |
| 2015/0019714 A1* | 1/2015 | Shaashua | H04W 4/023 709/224 |
| 2015/0020191 A1* | 1/2015 | Vida | G06F 21/32 726/17 |
| 2015/0053779 A1 | 2/2015 | Adamek et al. | |
| 2015/0058955 A1 | 2/2015 | Ganapathy et al. | |
| 2015/0066516 A1 | 3/2015 | Nishikawa et al. | |
| 2015/0097663 A1* | 4/2015 | Sloo | G01N 33/004 340/501 |
| 2015/0140990 A1* | 5/2015 | Kim | H04W 8/186 455/418 |
| 2015/0142704 A1* | 5/2015 | London | G06F 16/90332 706/11 |
| 2015/0154976 A1* | 6/2015 | Mutagi | G06F 3/167 704/275 |
| 2015/0161370 A1* | 6/2015 | North | G07C 9/37 726/5 |
| 2015/0162006 A1* | 6/2015 | Kummer | H04L 12/2816 704/275 |
| 2015/0163412 A1* | 6/2015 | Holley | H05B 47/19 348/143 |
| 2015/0168538 A1 | 6/2015 | Bradley et al. | |
| 2015/0170665 A1* | 6/2015 | Gundeti | G06F 3/167 704/270.1 |
| 2015/0195099 A1* | 7/2015 | Imes | H04L 12/2827 700/275 |
| 2015/0204561 A1* | 7/2015 | Sadwick | F24F 11/33 236/1 C |
| 2015/0222517 A1* | 8/2015 | McLaughlin | H04L 9/006 713/171 |
| 2015/0236899 A1 | 8/2015 | Sengupta et al. | |
| 2015/0242381 A1* | 8/2015 | Oh | H04L 51/066 715/204 |
| 2015/0263886 A1* | 9/2015 | Wang | H04L 41/12 370/254 |
| 2015/0264322 A1 | 9/2015 | Ang | |
| 2015/0294086 A1* | 10/2015 | Kare | G16H 20/70 705/2 |
| 2015/0312113 A1* | 10/2015 | Forutanpour | H04W 4/70 709/224 |
| 2015/0324706 A1 | 11/2015 | Warren | |
| 2015/0334554 A1* | 11/2015 | Song | H04W 8/183 455/558 |
| 2015/0347114 A1 | 12/2015 | Yoon | |
| 2015/0347683 A1* | 12/2015 | Ansari | G16H 10/60 726/7 |
| 2015/0348551 A1 | 12/2015 | Gruber et al. | |
| 2015/0350031 A1* | 12/2015 | Burks | G06F 3/04842 715/736 |
| 2015/0351145 A1* | 12/2015 | Burks | H04L 63/102 455/41.3 |
| 2015/0365217 A1* | 12/2015 | Scholten | H04L 5/0053 370/315 |
| 2015/0366035 A1* | 12/2015 | Baek | H05B 47/10 315/297 |
| 2015/0373149 A1* | 12/2015 | Lyons | H04L 12/2829 709/203 |
| 2016/0042748 A1* | 2/2016 | Jain | G10L 15/30 704/9 |
| 2016/0043962 A1* | 2/2016 | Kim | H04W 4/80 709/224 |
| 2016/0044032 A1* | 2/2016 | Kim | H04L 41/0806 726/5 |
| 2016/0098284 A1* | 4/2016 | Herberg | G06F 9/4411 719/327 |
| 2016/0098997 A1 | 4/2016 | Ding | |
| 2016/0099815 A1* | 4/2016 | Park | H04L 12/2807 370/254 |
| 2016/0134737 A1 | 5/2016 | Pulletikurty | |
| 2016/0139575 A1* | 5/2016 | Funes | G05B 15/02 700/275 |
| 2016/0195856 A1* | 7/2016 | Spero | H05B 47/125 700/90 |
| 2016/0259308 A1 | 9/2016 | Fadell et al. | |
| 2016/0269524 A1 | 9/2016 | Stottlemyer | |
| 2016/0344815 A1* | 11/2016 | Hyun | H04L 12/2803 |
| 2016/0358443 A1 | 12/2016 | True | |
| 2016/0359629 A1* | 12/2016 | Nadathur | H04L 9/006 |
| 2016/0366481 A1 | 12/2016 | Lim et al. | |
| 2017/0004828 A1 | 1/2017 | Lee et al. | |
| 2017/0055126 A1* | 2/2017 | O'Keeffe | H04W 4/21 |
| 2020/0159491 A1 | 5/2020 | Mutagi et al. | |
| 2020/0348124 A1 | 11/2020 | Froment et al. | |

OTHER PUBLICATIONS

Krishna et al., "Zigbee Based Voice Control System for Smart Home", IJCTA, Jan.-Feb. 2012, vol. 3, pp. 163-pp. 168.

Non Final Office Action dated Jan. 11, 2019 for U.S. Appl. No. 14/750,266 "Determining Relative Positions of User Devices" Fremont, 34 pages.

Office Action for U.S. Appl. No. 16/042,389, dated Feb. 14, 2020, Mutagi, "Grouping Devices for Voice Control", 28 Pages.

Office Action for U.S. Appl. No. 16/042,389, dated Jul. 6, 2020, Mutagi, "Grouping Devices for Voice Control ", 28 Pages.

Office Action for U.S. Appl. No. 14/752,321, dated Jan. 25, 2019, Mutagi et al., "Creating Scenes from Voice-Controllable Devices", 51 pages.

Office action for U.S. Appl. No. 14/752,321, dated Oct. 4, 2016, Mutagi et al., "Creating Scenes from Voice-Controllable Devices", 39 pages.

Office Action for U.S. Appl. No. 16/523,481, dated Nov. 13, 2020, Raeber, "Interoperability of Secondary-Device Hubs ", 11 Pages.

Office Action for U.S. Appl. No. 14/752,134, dated Nov. 2, 2017, Mutagi, "Remote Execution of Secondary-Device Drivers", 37 pages.

Office action for U.S. Appl. No. 14/752,257, dated Nov. 28, 2016, Mutagi et al., "Mapping Device Capabilities to a Predefined Set", 32 pages.

Office Action for U.S. Appl. No. 14/750,266, dated Nov. 30, 2017, Mutagi, "Remote Execution of Secondary-Device Drivers", 29 pages.

Office action for U.S. Appl. No. 14/752,198, dated Dec. 2, 2016, Mutagi et al., "Grouping Devices for Voice Control", 33 pages.

Final Office Action dated Dec. 14, 2018 for U.S. Appl. No. 14/752,134 "Remote Execution of Secondary-Device Drivers" Mutagi, 50 pages.

Office action for U.S. Appl. No. 14/752,198, dated Dec. 26, 2017, Mutagi et al., "Grouping Devices for Voice Control", 20 pages.

Office action for U.S. Appl. No. 14/752,321, dated Dec. 26, 2017, Rohan Mutagi, "Creating Scenes from Voice-Controllable Devices", 47 pages.

Office action for U.S. Appl. No. 14/752,198, dated Mar. 10, 2016, Mutagi et al., "Grouping Devices for Voice Control", 17 pages.

Office action for U.S. Appl. No. 14/752,257, dated Mar. 14, 2016, Mutagi et al., "Mapping Device Capabilities to a Predefined Set ", 19 pages.

Office action for U.S. Appl. No. 14/752,321, dated Mar. 23, 2016, Mutagi et al., "Creating Scenes from Voice-Controllable Devices", 21 pages.

Office action for U.S. Appl. No. 14/752, 134, dated Mar. 24, 2016, Mutagi et al., "Remote Execution of Secondary-Device Drivers", 17 pages.

Office Action for U.S. Appl. No. 14/788,327, dated Apr. 10, 2018, Raeber et al., "Interoperability of Secondary-Device Hubs", 15 pages.

(56) References Cited

OTHER PUBLICATIONS

Office Action for U.S. Appl. No. 14/752,134, dated Apr. 19, 2018, Mutagi, "Remote Execution of Secondary-Device Drivers", 48 pages.
Office action for U.S. Appl. No. 14/752,321, dated May 25, 2017, Rohan Mutagi, "Creating Scenes from Voice-Controllable Devices", 45 pages.
Office action for U.S. Appl. No. 14/752,134, dated May 3, 2017, Mutagi et al., "Remote Execution of Secondary-Device Drivers", 28 pages.
Office Action for U.S. Appl. No. 14/750,266, dated Jun. 28, 2018, Froment, "Determining Relative Positions of User Devices", 32 pages.
Office action for U.S. Appl. No. 14/752,198, dated Jun. 30, 2017, Mutagi et al., "Grouping Devices for Voice Control", 43 pages.
Office Action for U.S. Appl. No. 14/752,257, dated Aug. 11, 2017, Rohan, "Mapping Device Capabilities to a Predefined Set", 51 pages.
Office Action for U.S. Appl. No. 16/042,389, dated Aug. 19, 2019, Mutagi, "Grouping Devices for Voice Control ", 24 pages.
Office Action for U.S. Appl. No. 14/788,327, dated Sep. 12, 2018, Raeber et al., "Interoperability of Secondary-Device Hubs", 13 pages.
Office action for U.S. Appl. No. 14/752, 134, dated Sep. 22, 2016, Mutagi et al., "Remote Execution of Secondary-Device Drivers", 24 pages.
Ranger, "What is Apple iBeacon? Here's what you need to know", ZDNet, retreived at <<http://www.zdnet.com/article/what-is-apple-ibeacon-heres-what-you-need-to-know/>>, Jun. 10, 2014, 4 pages.
Office Action for U.S. Appl. No. 16/523,481, dated Apr. 13, 2021, Raeber , "Interoperability of Secondary-Device Hubs ", 12 pages.
Office Action for U.S. Appl. No. 16/657,938, dated Nov. 3, 2021, Mutagi, "Remote Execution of Secondary-Device Drivers", 29 pages.
Office Action for U.S. Appl. No. 16/523,481, dated Aug. 18, 2021, Raeber, "Interoperability of Secondary-Device Hubs ", 12 pages.
Office Action for U.S. Appl. No. 16/424,285, dated Aug. 20, 2021, Mutagi, "Creating Scenes From Voice-Controllable Devices", 32 pages.
Office Action for U.S. Appl. No. 16/424,285, dated Dec. 27, 2021, Mutagi, "Creating Scenes From Voice-Controllable Devices", 32 pages.
Office Action for U.S. Appl. No. 16/875,319, mailed on Nov. 17, 2022, Arnaud Marie Froment, "Determining Relative Positions of User Devices", 12 pages.
Office Action for U.S. Appl. No. 17/737,383, mailed on Feb. 16, 2023, Inventor #1 Eric Peter Raeber, "Interoperability of Secondary-Device HUBS", 11 pages.

* cited by examiner

GROUPING DEVICES FOR VOICE CONTROL

CROSS REFERENCE TO RELATED APPLICATIONS

This application is a continuation of and claims priority to U.S. patent application Ser. No. 16/042,389 filed on Jul. 23, 2018, entitled, "Grouping Devices for Voice Control," set to issue as U.S. Pat. No. 10,976,996 on Apr. 13, 2021, which is a continuation of and claims priority to U.S. patent Ser. No. 14/752,198, filed on Jun. 26, 2015, entitled "Grouping Devices for Voice Control," issued as U.S. Pat. No. 10,031,722 on Jul. 24, 2018 which claims the benefit of priority to provisional U.S. patent application Ser. No. 62/134,465, filed on Mar. 17, 2015 and entitled "Remote Execution of Appliance Drivers," which are herein incorporated by reference in their entirety.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech input and gestures.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a schematic diagram of the illustrative environment of FIG. 1 after the user of FIG. 1 has created the group entitled "Office Lights". As illustrated, the user issues a voice command to turn on his "office lights" and, in response, the two devices forming the group turn on.

DETAILED DESCRIPTION

Figure 1:
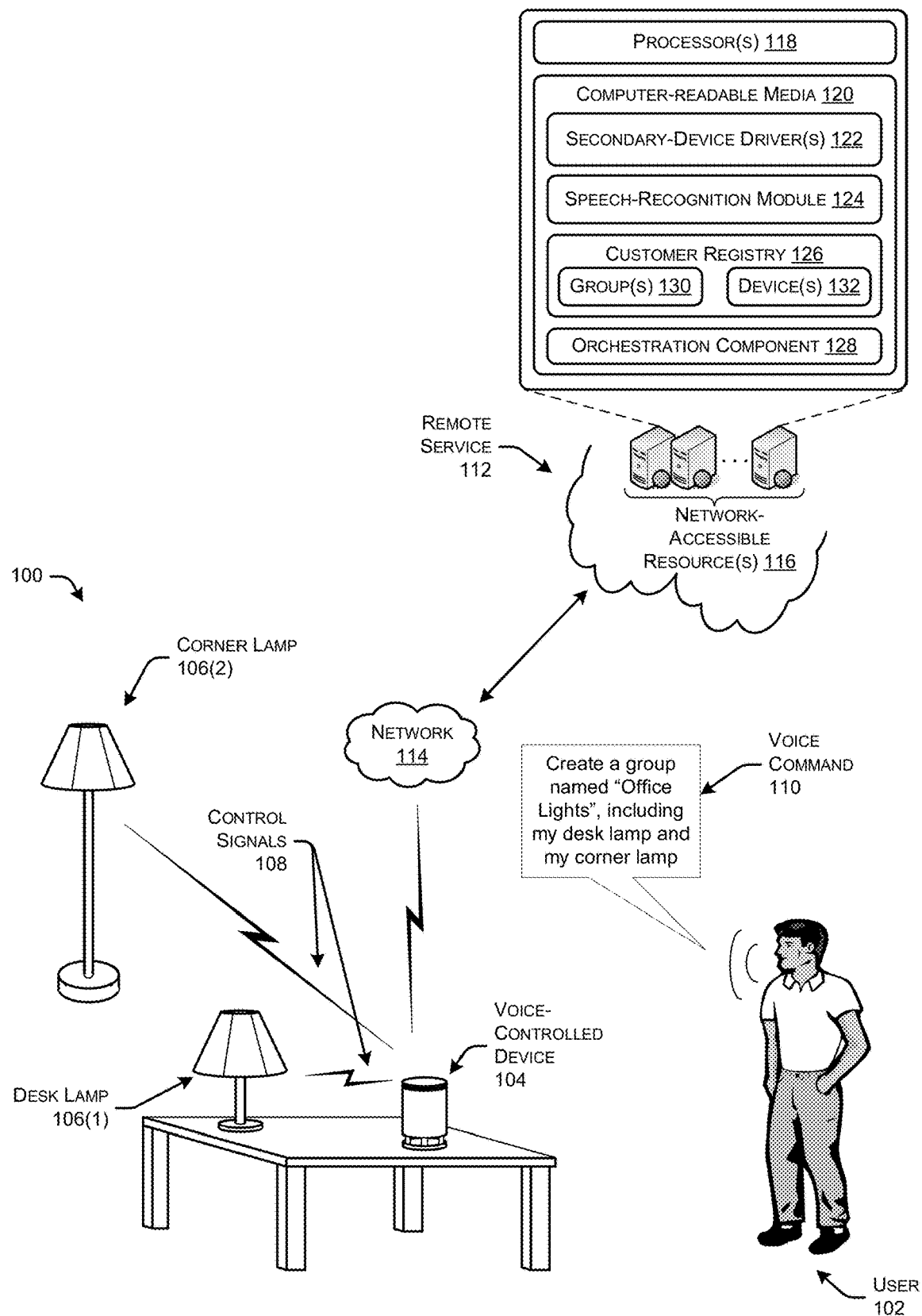
FIG. 1 is a schematic diagram of an illustrative environment in which a user issues a voice command to a device, requesting to create a group of devices for controlling the group with a single voice command.

Techniques for creating groups of devices for controlling these groups with voice commands are described herein. For instance, an environment may include an array of secondary devices (or "smart appliances", or simply "devices") that are configured to perform an array of operations. To illustrate, an environment may include secondary devices such as lights, dishwashers, washing machines, coffee machines, refrigerators, telephones, tablets, door locks, window blinds, thermostats, garage door openers, televisions, audio systems, air-conditioning units, alarm systems, motion sensors, ovens, microwaves, and the like. These devices may be capable of coupling to a network (e.g., a LAN, WAN, etc.) and/or may be capable of communicating with other devices via short-range wireless radio communication (e.g., Bluetooth®, Zigbee®, etc.). As such, these devices may be controllable by a user remotely, such as via a graphical user interface (GUI) on a mobile phone of the user, via voice commands of the user, or the like.

In some instances, the environment includes a device configured to receive voice commands from the user and to cause performance of the operations requested via these voice commands. Such a device, which may be known as a "voice-controlled device", may include one or more microphones for generating audio signals that represent or are otherwise associated with sound from an environment, including voice commands of the user. The voice-controlled device may also be configured to perform automatic speech recognition (ASR) on the audio signals, or may be configured to provide the audio signals to another device (e.g., a device of a remote service) for performing the ASR on the audio signals. After the voice-controlled device or another device identifies a voice command of the user, the voice-controlled device or the other device may attempt to the requested operation to be performed.

In some instances, the voice-controlled device may be configured to interact with and at least partly control the other devices in the environment, described above as secondary devices, smart appliances, or simply devices. As such, a user may issue voice commands to the voice-controlled device relating to these other devices. For instance, a user may issue a voice command to the voice-controlled device to "turn on my desk lamp". The voice-controlled device or another device may perform ASR on a generated audio signal to identify the command ("turn on") along with the referenced device ("my desk lamp"). The user may have previously indicated that a particular lamp within the environment is to be named "my desk lamp" and, hence, the voice-controlled device or another device may determine which device to "turn on". Furthermore, a device driver associated with the desk lamp (stored locally on the voice-controlled device or remotely from the environment) may generate a command that, when executed by the desk lamp, causes the desk lamp to turn on. This command may be provided to the voice-controlled device, which may in turn provide the generated command to the desk lamp, such as via Bluetooth®, Zigbee®, WiFi, or whatever other protocol the desk lamp is configured to communicate over. Upon receiving the command, the desk lamp may execute the command and, hence, may turn on.

As shown above, a user is able to issue voice commands for the purpose of controlling devices within the environment of the user (or within other remote environments). In some instances, however, it may be helpful for the user to create groups of devices for controlling these groups with single voice commands. For instance, a user may create a group consisting of every light in his house, or every light in the kitchen of his house, such that the user is able to modify the state of multiple lights at one time. For instance, once a user has created a group consisting of all of the user's kitchen lights, the user may issue a voice command stating "Turn off my kitchen lights". Similar to the above, the voice-controlled device or another device may identify the voice command from a generated audio signal. In this case, the voice-controlled device or the other device may identify that the voice command includes a requested operation ("turn off") and an indication of a previously defined group of devices ("my kitchen lights"). Therefore, the voice-controlled device or the other device may identify those devices in the group, may identify the respective device drivers associated with these devices, and may request that these device drivers generate respective commands for causing their respective devices to turn off. Upon receiving these generated commands, the voice-controlled device may send these commands to corresponding devices of the group, with each device in turn executing the command and, therefore, turning off.

Therefore, using the techniques described herein, a user is able to conveniently interact with multiple devices at one time through creation of device groups. In some instances, a created group of devices may change over time, while in other instances a group may remain fixed For example, envision that the example user from above creates the example group "my kitchen lights". This group may change as lights are added to or removed from the user's kitchen, or the group may consist of those lights associated with the kitchen at the time of the user creating the group.

As described in further detail below, a user may request creation of a group in multiple ways. In some instances, the described techniques include a graphical user interface (GUI) for allowing the user to select the devices that he wishes to include a particular group. In addition, the GUI may provide the user the opportunity to name the group such that the group is now addressable via the given name. In still other instances, the GUI may allow the user to create groups by selecting device capabilities and requesting creation of a group consisting of devices that have these specified capabilities. For instance, a user may select, from the GUI, a device capability of "dims" and may request to create group named "my lights that dim". In response, the voice-controlled device or another device may identity those devices that have been registered to the user that are capable of being dimmed. The voice-controlled device or the other device may then create a group consisting of these devices. After creation of this group, the user is thereafter able to control this group via a single voice command, for example "please lower all my lights that dim to 20%". In response to identifying this voice command, the techniques may dim each light in this group to 20% of its maximum brightness.

In other instances, the user may request to create a group of devices using voice commands. For instance, the user may issue a voice command to the voice-controlled device to "create a group named 'my lights that dim'". After the voice-controlled device or the other device identifies the voice command and the requested operation, the voice-controlled device (or another device) may output audio asking the user which devices to include in this group. The user may respond by issuing a voice command stating the name of each device to include in this group or, as discussed above, may state one or more device capabilities. In the latter instances, the voice-controlled device or another device may identify the devices having the specified capabilities and may create the requested group. That is, the voice-controlled device or another device may store an indication for each identified device that the respective device is part of the group associated with the user named "my lights that dim". Thereafter, the user may control the multiple devices via single voice commands.

In the above examples, the user is able to create device groups via explicit requests, such as through requests made via a GUI or via voice commands explicitly calling out the names of the groups. In other instances, the user may control a group of devices implicitly or "on the fly". That is, rather than creating a group ahead of time, the user may issue a voice command to voice-controlled device requesting to perform an operation to those devices having certain characteristics. For instance, the user may specify an operation to be performed by devices having one or more device capabilities, potentially along with other characteristics such as a specified location.

To provide an example, the user may issue a voice command to the voice-controlled device to "dim to 20% all of my upstairs lights that are capable of being dimmed." In response to identifying this voice command from a generated audio signal, the voice-controlled device or another device may identify the requested operation "dim to 20%" along with the requested devices that are to perform the operation, those devices that reside upstairs in the home of the user and are capable of being dimmed. After identifying the contents of the voice command, the voice-controlled device or the other device may identify the devices associated with the voice command by determining which devices from the devices registered to the user have a device capability of dimming. Thereafter, the voice-controlled device or the other device may determine which of these devices capable of dimming have been tagged or otherwise indicated by the user to reside "upstairs". After identifying this set of devices, the voice-controlled device or the other device may interact with the respective device drivers of these devices to generate respective commands to cause these devices to dim to 20% of their maximum brightness. After the device drivers have created their respective commands, the commands may be provided to the respective devices, which in turn execute the commands and, hence, dim to 20% as the user initially instructed.

Furthermore, while the above examples describe a user requesting to perform an operation (e.g., on a device or a group of devices), in other instances a device rather than a user may initiate a process for causing a secondary device or a group of secondary devices to perform an operation. For instance, a device may be programmed to perform a certain operation upon one or more conditions being met, such as a user being detected in an environment, a time of day occurring, or the like. For instance, a motion sensor may detect the presence of a user and may initiate a process for causing a light to turn on or causing a group of lights to turn on.

As discussed above, voice-controllable devices may grouped in response to a user explicitly identifying the names of the devices or by the user specifying characteristics of the devices to be included in a group, such as the capabilities of the respective devices. In order to allow users to create groups of devices by specifying device capabilities, the techniques described herein also define a set of predefined device capabilities generally offered by available devices generally. Thereafter, as a particular user introduces new secondary devices into his environment and registers these devices, the techniques may identify the capabilities of the new device and map these capabilities to one or more of the predefined device capabilities of the set. Further, if the new device offers a capability not represented in the set, then the techniques may add this device capability to the set of predefined device capabilities.

By creating a set of a predefined device capabilities and mapping each features of each new device to one of the predefined device capability, a user is able to precisely identify groups of devices by specifying the capabilities of the devices that are to be included into the group. The predefined device capabilities may indicate whether a device is able to turn on or off, turn on or off using a delay function, change a volume, change a channel, change a brightness, change a color, change a temperature, or the like.

To provide several examples, for instance, envision that a particular user provides an indication to the voice-controlled device that he has installed a "smart light bulb" in his kitchen. As described above, the user may name the device (e.g., "my kitchen lamp"). In addition, the voice-controlled device or another device may determine the capabilities of this particular device and may map these capabilities to the predefined set of capabilities. In this example, the voice-controlled device or the other device may determine that the smart light bulb is able to turn on or off, is able to change brightness (or be dimmed), and is able to change color. Therefore, the voice-controlled device or the other device stores, in association with the user's "kitchen lamp", an indication that this particular device has these three capabilities. In addition, the user may request to associate (or "tag") certain other characteristics with this device, such as the location of the device within the environment of the user. In this example, the user may specify that the light bulb resides in a kitchen of the user.

After the voice-controlled device or the other device has stored this information in association with the light bulb of the user, the user may now perform voice commands on the device and/or may create device groups by specifying capabilities of the smart light bulb. For instance, if the user issues a voice command to "dim all of my lights that dim", the voice-controlled device or another device may identify those devices capable of dimming (or changing brightness)—including the user's kitchen lamp—and may cause the devices to perform the requested operation. Similarly, if the user issues a voice command to "create a group called 'dimmers' from my devices that are lights that dim". In response, the voice-controlled device or the other device may identify those devices meeting these requirements (are capable of dimming and are "light" devices)—including the user's kitchen lamp—and may create a corresponding group.

To provide another example, the user may introduce a television to the environment of the user and may register this television with the voice-controlled device or the other device. When doing so, the user may specify the name of the device (e.g., "downstairs television") and the voice-controlled device or the other device may determine capabilities of the television. In this instance, the voice-controlled device or the other device may determine that the television is capable of being turned on or off, capable of changing brightness (or dimming), capable of changing volume, and capable of changing a channel/station. In some instances, the device making these determinations may do so by identifying the exact device introduced into the environment and referencing product specifications associated with this device.

In yet another example, the user may register a smart thermostat for regulating the temperature of the user's environment. In response, the voice-controlled device or another device may determine that the thermostat is able to turn on or off, change a temperature, as well as change a brightness (such as a brightness of its LED screen). Further, when a user registers a refrigeration as residing with his environment, the voice-controlled device or the other device may determine that the refrigerator is able to turn on or off and change a temperature.

Further details regarding the creation of voice-controllable device groups and the user of device capabilities are described below. Further, while a few example devices (or "smart appliances") have been described, it is to be appreciated that the techniques may utilize an array of other such devices, such as audio systems, locks, garage doors, washing machines, dryers, dishwashers, coffee makers, refrigerators, doors, shades, or the like. Each of these secondary devices may communicatively couple to a controlling device of a user, such as the voice-controlled device described above. Furthermore, the device configured to couple with and control the secondary device (and configured to interact with the remote service described below) may comprise the voice-controlled device described above, a tablet computing device, a mobile phone, a laptop computer, a desktop computer, a set-top box, a vision-based device, or the like. Further, while a few example environments are described, it is to be appreciated that the described techniques may be implemented in other environments. Further, it is appreciated that the term "environment" may include a location of a user, one or more user-side devices, one or more server-side devices, and/or the like.

FIG. 1 is an illustration of an example environment 100 in which a user 102 utilizes a voice-controlled device 104 to control one or more secondary devices, in this example comprising a desk lamp 106(1) and a corner lamp 106(2). FIG. 1 is provided to aid in comprehension of the disclosed techniques and systems. As such, it should be understood that the discussion that follows is non-limiting.

Within FIG. 1, the user 102 may interact with secondary devices within the environment 100 by using voice commands to the voice-controlled device 104. For instance, if the user 102 would like to turn on the desk lamp 106(1), the user 102 may issue a voice command to the voice-controlled device 104 to "turn on my desk lamp". Multiple other voice commands are possible, such as "dim my desk lamp" or, in the case of other secondary devices, "close my garage door", "mute my television", "turn on my stereo", or the like. In each cases, the voice-controlled device 104 may interact with a remote service, discussed below, to cause the respective device to perform the requested operation. For instance, the voice-controlled device 104 may generate or receive a command from a device driver associated with a particular device and may send this command to the device via a control signal 108. Upon the respective device receiving the command, the device, such as the desk lamp 106(1), may execute the command and perform the operation, such as turn on.

In this example, however, the user 102 wishes to create a group of devices such that devices of the group are later controllable by individual voice commands. Accordingly, the user 102 speaks a natural language command 110, such as "Create a group named 'Office Lights', including my desk lamp and my corner lamp." The sound waves corresponding to the natural language command 110 may be captured by one or more microphone(s) of the voice-controlled device 104. In some implementations, the voice-controlled device 104 may process the captured signal. In other implementations, some or all of the processing of the sound may be performed by additional computing devices (e.g. servers) connected to the voice-controlled device 104 over one or more networks. For instance, in some cases the voice-controlled device 104 is configured to identify a predefined "wake word" (i.e., a predefined utterance). Upon identifying the wake word, the device 104 may begin uploading an audio signal generated by the device to the remote servers for performing speech recognition thereon, as described in further detail below.

FIG. 1 illustrates that the voice-controlled device 104 may couple with a remote service 112 over a network 114. The network 114 may represent an array or wired networks, wireless networks (e.g., WiFi), or combinations thereof. The remote service 112 may generally refer to a network-accessible platform—or "cloud-based service"—implemented as a computing infrastructure of processors, storage, software, data access, and so forth that is maintained and accessible via the network 114, such as the Internet. Cloud-based services may not require end-user knowledge of the physical location and configuration of the system that delivers the services. Common expressions associated with cloud-based services, such as the remote service 112, include "on-demand computing", "software as a service (SaaS)", "platform computing", "network accessible platform", and so forth.

As illustrated, the remote service 112 may comprise one or more network-accessible resources 116, such as servers. These resources 116 comprise one or more processors 118 and computer-readable storage media 120 executable on the processors 118. The computer-readable media 120 may store one or more secondary-device drivers 122, a speech-recognition module 124, a customer registry 126, and an orchestration component 128. Upon the device 104 identifying the user 102 speaking the predefined wake word (in some instances), the device 104 may begin uploading an audio signal representing sound captured in the environment 100 up to the remote service 112 over the network 114. In response to receiving this audio signal, the speech-recognition module 124 may begin performing automated speech recognition (ASR) on the audio signal to generate text and identify one or more user voice commands from the generated text. For instance, in the illustrated example, the speech-recognition module 124 may identify the user requesting to create the group of devices including the desk lamp and the corner lamp.

Upon the identifying the voice command (initially spoken by the user 102 as the natural-language command 110), the orchestration component 126 may identify the request to create a group. In addition, the orchestration component 126 may attempt to identify the secondary devices from which the user 102 is requesting to create the group. To aid in this identification, the device 104 may send an identifier associated with the device 104 and/or the user 102 when or approximately when the device 104 uploads the audio signal to the remote service 102. For instance, the device 104 may provide a MAC address, IP address, or other device identifier (DID) identifying the device 104. Additionally or alternatively, the device 104 may provide an identification of the user 102, such as an email address of the user 102, a username of the user 102 at the remote service 112, or the like.

Using this information, the orchestration component 128 may identify a set of one or more secondary devices 132 that have been registered to the user 102 and/or have been registered as residing with the environment 100 within the customer registry 126. For instance, the user 102 may have initially registered the desk lamp 106(1) and the corner lamp 106(2), amongst multiple other secondary devices that may be controllable via the voice-controlled device 104 and/or other devices, such as other lights, door locks, doors, window blinds, a coffee maker, a dishwasher, a washing machine, a dryer, a garage door opener, a thermostat, or the like.

In addition, the orchestration component 128 may utilize a verbal description of the references secondary device, in this case "the desk lamp" and the "corner lamp", to determine the secondary devices referenced in the natural-language command 110. Here, the user 102 may have initially provided an indication to the remote service 112 that the illustrated desk lamp 106 is to be named "the desk lamp" while the illustrated standing lamp is to be named the "corner lamp". Therefore, having identified the verbal description of the two of secondary devices referenced in the voice command 110, the orchestrator 128 may map these verbal descriptions to devices indicated in the customer registry 126 as being associated with the user 102. In addition, the orchestration component 126 may instruct the customer registry 126 to create a group 130 consisting of the desk lamp 106(1) and the corner lamp 106(2). Once the registry 126 has created the group, the user 102 may issue voice commands that reference the group and that cause each device within the group to perform a requested operation.

Figure 2:
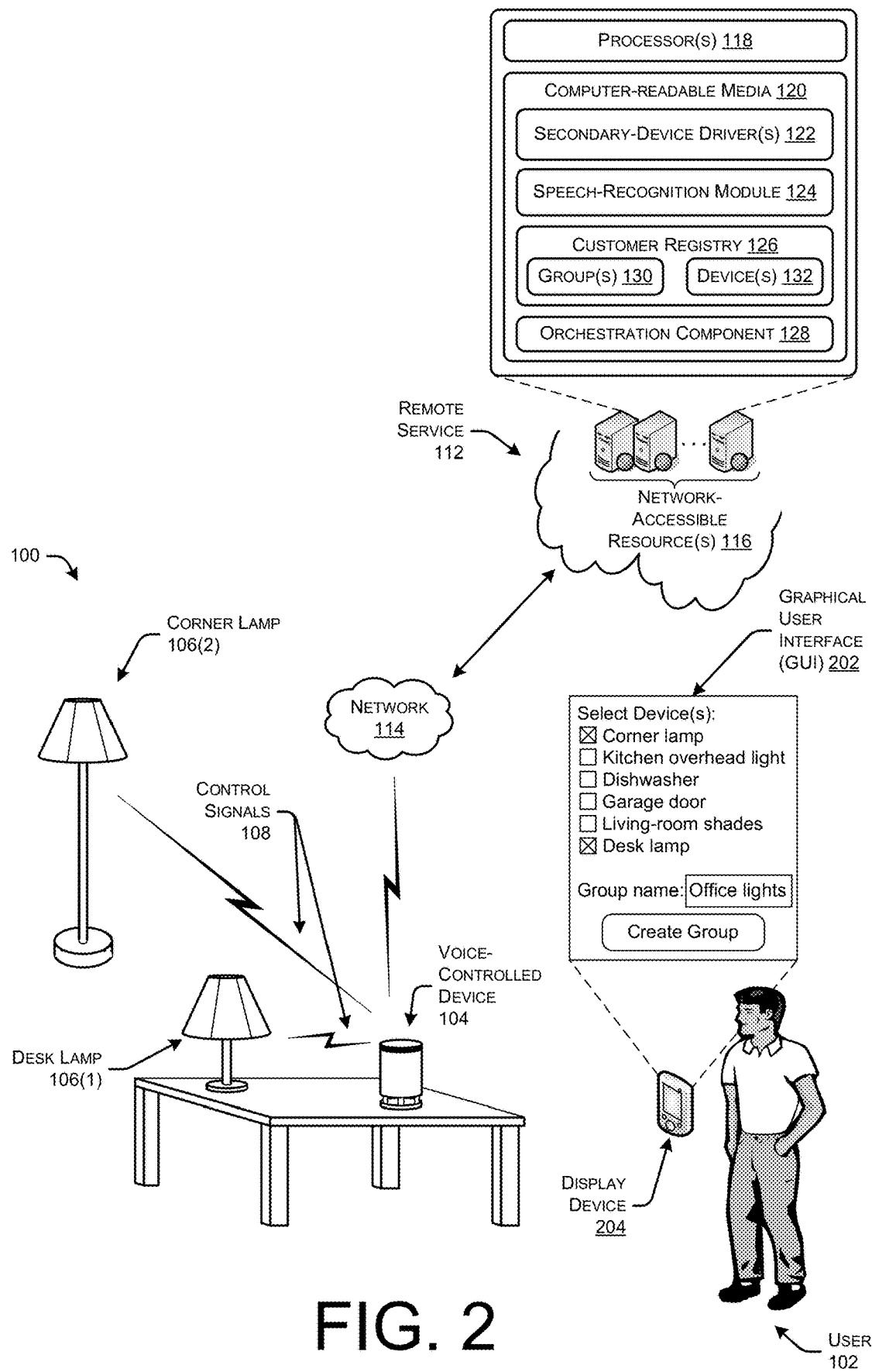
FIG. 2 is a schematic diagram of the illustrative environment of FIG. 1 in which the user requests to create the voice-controllable group of devices via a graphical user interface (GUI).

FIG. 2, meanwhile, illustrates an example where the user 102 is able to create a group of device using a graphical user interface (GUI) 202 rendered on a display device 204 of the user 102. In some instances, the remote service 112 may provide data for displaying the GUI 202 to the display device 202. As illustrated, the GUI may list out devices having been registered, within the customer registry 126, as residing with the environment 100 of the user. In the illustrated example, these devices include the corner lamp 106(2), a kitchen overhead light, a dishwasher, a garage door, living-room shades, and the desk lamp.

As illustrated, the GUI may provide functionality to allow the user 102 to issue a request to create a group and to specify which devices of the user 102 are to be included in the group. For instance, the example illustrated GUI 202 includes checkboxes adjacent to each listed device to allow a user to select the corresponding device. In addition, the GUI 202 includes a text box that allows a user to specify a name for the group of devices. Finally, the example GUI 202 includes an icon for sending the request to create the group to the remote service 112.

In the illustrated example, the user has selected the checkboxes associated with the corner lamp 106(2) and the desk lamp 106(1) and has specified a group name of "Office Lights". After selecting the icon to create the group, the display device 102 may send the request to create the group to the remote service 112. The orchestration component 128 may identify the request to create the group, along with the two devices requested to comprise the group. In response, the customer registry 126 may store an indication of this group, entitled "Office Lights", in the groups 130 associated with the user 102. Again, the user may thereafter control devices within this group through respective voice commands, as discussed immediately below.

Figure 3:
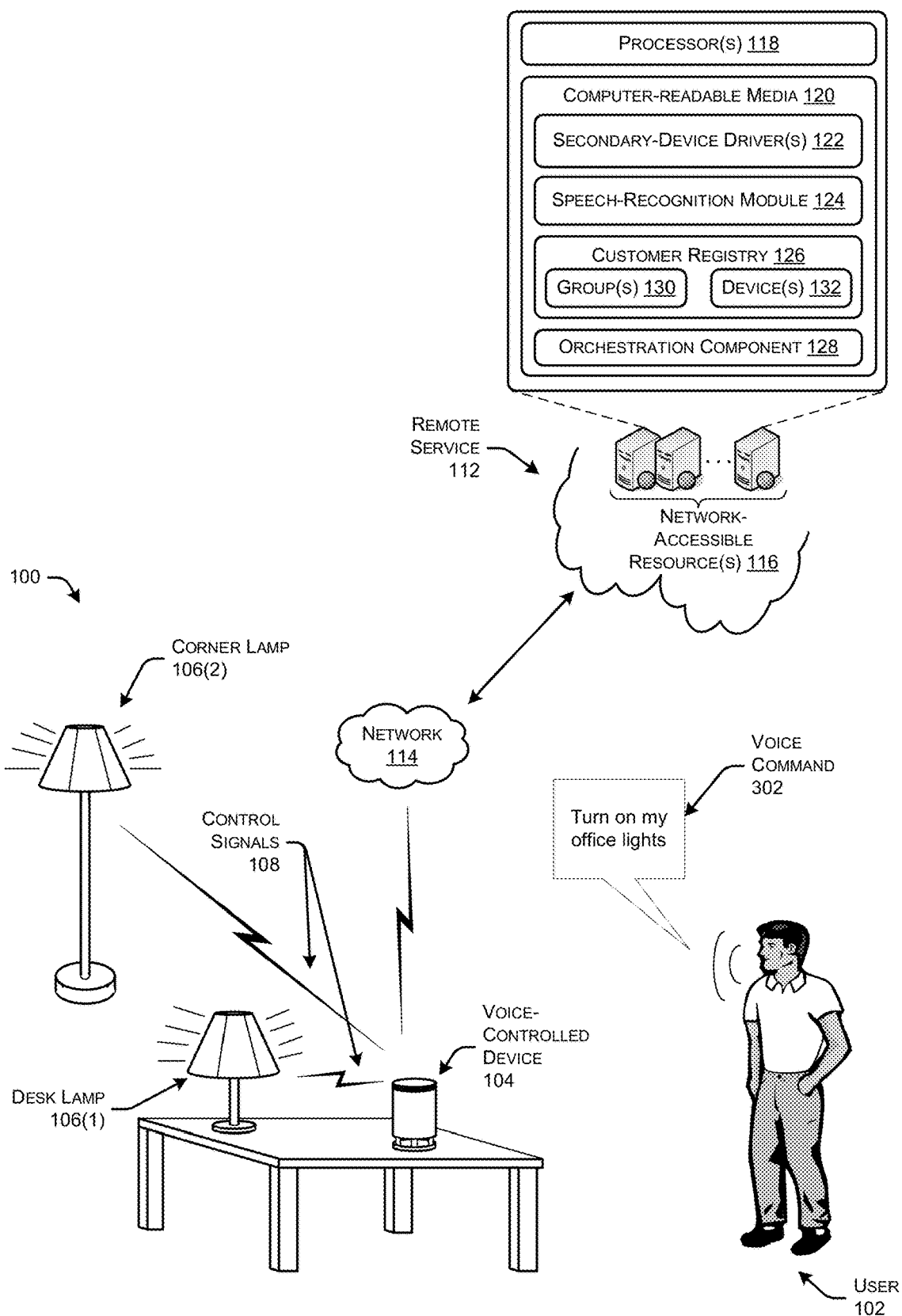

FIG. 3 illustrates the environment of FIG. 1 or 2 after the remote service 112 has created the group "Office Lights" on behalf of the user 102. As illustrated, the user 102 issues a voice command 302 to "turn on my office lights". Again, one or more microphones of the voice-controlled device 104 may generate an audio signal that includes this voice command 302 and may provide this audio signal over the network 114 to the remote service 112.

Upon receiving the audio signal, the speech-recognition module 124 may perform ASR on the audio signal to identify the voice command 302. This may include identifying the requested operation ("turn on") as well as identifying the group to which the command applies ("office lights"). The orchestration component 128 may receive an indication of the voice command 302 and may analyze the groups 130 to determine whether a group entitled "office lights" exists. In this instances, the groups 130 will indicate that such a group exists and includes the desk lamp 106(1) and the corner lamp 106(2).

After identifying the devices that are to be "turned on" in compliance with the voice command 302 of the user 102, the orchestration component 128 may identify a type or class of these secondary devices to determine which secondary-device drivers are responsible for creating commands for causing the secondary devices to perform requested operations. As is known, device drivers represent executable programs that operate and/or control a particular type of device. That is, a device driver for a particular device (in this case a "secondary device") provides a software interface for the secondary device. Because device drivers, including the secondary-device drivers 122, are hardware-dependent, secondary devices (and devices in general) often need custom drivers.

After the orchestration component 128 identifies the type of device of the desk lamp 106(1) and the corner lamp 106(2)—and, hence, identifies the secondary-device drivers associated with these devices—the orchestration component 126 may provide information indicative of the user's request to the appropriate the secondary-device drivers 122. That is, the orchestration component 126 may send, to the secondary-device driver configured to generate commands for the desk lamp 106(1) and to the secondary-device driver configured to generate commands for the corner lamp 106(2), an indication that the user 102 has requested to turn on the desk lamp or the corner lamp, respectively. In response to receiving this information, the secondary-device drivers (which may reside on the voice-controlled device 104, at the remote service 112 (as illustrated), or otherwise) may proceed to generate respective commands to turn on the desk lamp and to turn on the corner lamp. Thereafter, the remote service 112 may send the generated commands back to the voice-controlled device 104 to which the user initially issued the natural-language command 110. Furthermore, while the above example describes commands being routed from the secondary-device drivers back to the device that initially received the request from the user to perform the operation, in other instances the secondary-device drivers may route these commands in other ways. For instance, the secondary-device drivers may route these commands back to the environment 100 outside of the channel used to route the request to the driver. In some instances, the driver may route this command to the secondary device that is to execute the command, while in other instances the driver may route this command via the different channel to the device that initially received the user request, which in turn may send this command to the secondary device.

In instances where the device that received the initial user request receives a generated command from a secondary-device driver, the voice-controlled device 104 may pass the respective commands, via the control signals 108, to the desk lamp 106(1) and the corner lamp 106(2) upon receiving these generated commands. In response to receiving the commands, these secondary devices may proceed to execute the commands. In this instance, the desk lamp and the corner lamp may turn on, as illustrated.

In some instances, the voice-controlled device 104 is free from some or all of the secondary-device drivers associated with the desk lamp 106(1), the corner lamp 106(2), and other smart appliances located with the environment 100. Instead, the device 104 includes one or more protocol primitives for communicating with secondary devices, such as the desk lamp and the corner lamp. For instance, the device 104 may be configured to communicate via short-range wireless radio communication protocols, such as Bluetooth®, Zigbee®, infrared, and the like. As such, the user 102 need not program the device 104 with the secondary-device driver of the desk lamp or the corner lamp. Instead, the device 104 communicates with the remote service 112 that has access to the secondary-device drivers 122, which in turn provides generated commands back to the device 104 for issuing to the secondary devices within the environment. As such, manufacturers of secondary devices and/or other entities may provide the secondary-device drivers to the remote service for use across many environments, such as the environment 100. Therefore, the user 102 may be able to operate multiple secondary devices via the device 104 and/or other client devices without storing the corresponding secondary-device drivers on these user devices.

Furthermore, while the above example describes the voice-controlled device 104 receiving the initial request from the user and thereafter receiving the generated commands from the remote service and providing these commands to the secondary devices 106(1) and 106(2), other communication paths are possible. For instance, the voice-controlled device 104 (or another device) may receive the initial request from the user and may provide information indicative of this request to the remote service 112 (e.g., in the form of a generated audio signal, an actual voice command if the device 104 performs the speech recognition, or the like). Thereafter, the remote service 112 may generate the respective commands using the appropriate secondary-device drivers but may provide this command to a different user device in the environment 100. For instance, if the remote service 112 determines that the desk lamp communicates via a protocol not supported by the voice-controlled device 104, the remote service 112 may provide this generated command to another device (e.g., a tablet computing device in the environment 100) that is able to communicate the command to the desk lamp 106 using the appropriate communication protocol. Or, the voice-controlled device 104 may receive the generated command from the remote service and may provide the command to another device (e.g., the tablet), which may in turn communicate the command to the desk lamp 106.

FIGS. 1 and 2, discussed above, illustrate example manners in which a user could explicitly create groups via voice commands or via a GUI. FIG. 3, meanwhile, illustrates how the user may interact with the group via voice commands after creation of the group.

Figure 4:
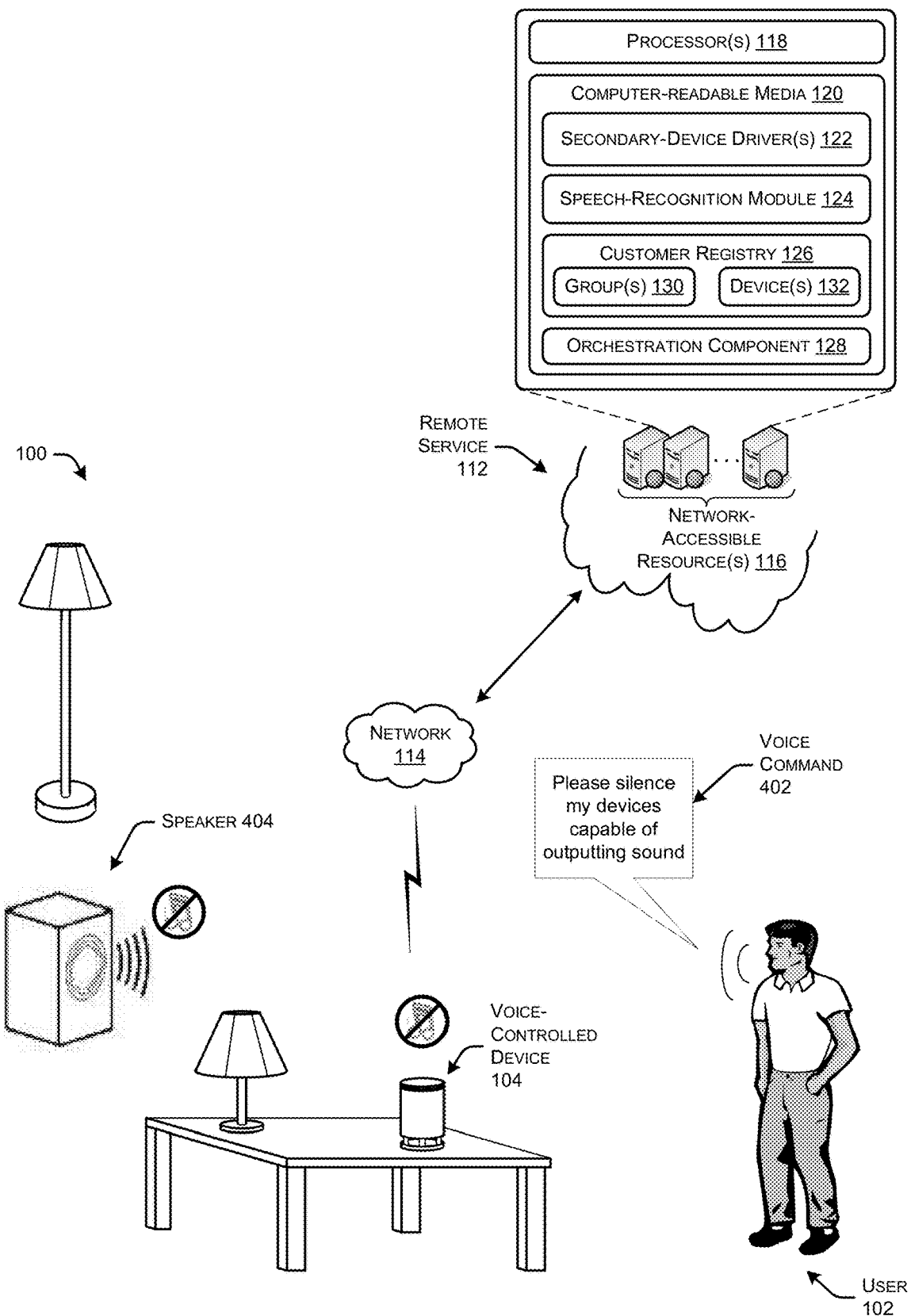
FIG. 4 is a schematic diagram of the illustrative environment of FIG. 1 in which the user controls multiple devices in with a single voice command by issuing a request to perform an operation on a group of devices having a certain device capability. In this example, the user requests to silence all of his devices that are capable of outputting sound, thus controlling a group of devices that having the specified device capability.

FIG. 4, meanwhile, illustrates how a user may create a group "on-the-fly" by requesting to perform an operation on a group of one or more devices having certain characteristics, such as certain capabilities. As illustrated, FIG. 4 includes the user 102 issuing a voice command 402 to the voice-controlled device 104, requesting to "Please silence my devices capable of outputting sound". In response, the voice-controlled device 104 may generate an audio signal and pass this audio signal to the remote service 112, which may perform ASR on the signal to identify the voice command 402. After identifying the voice command 402, the orchestration component may parse the voice command to identify the requested operation (muting devices) as well as the devices to which the command applies. In this instances, the orchestration component 128 may initially attempt to determine whether or not the groups 130 of the customer registry 126 include a group entitled "my devices capable of outputting sound". In response to determining that no such group exists (at least for the user 102), the orchestration component 128 may interpret this command as specifying devices that comply with a device capability. As such, the orchestration component 128 may identify, from the devices 132 registered to the user 102 in the customer registry 126, those devices that are associated with a device capability of "changing a volume".

After identifying the devices having this capability—which collectively define the group that is to be silenced—the orchestration component 128 may again identify the appropriate device drivers for generating the commands for causing the devices to perform the requested operation. In this example, the orchestration component 128 determines that the environment 100 includes two devices associated with the capability of changing volume—the voice-controlled device 104 itself, along with a speaker 404. As such, the orchestration component 128 may instruct the device drivers associated with these devices to generate respective commands to cause these devices to silence their audio. These drivers may accordingly generate their commands and provide the commands to the voice-controlled device 104, which may execute the command intended for itself and may pass the command intended for the speaker 404 to the speaker 404. In response, both the voice-controlled device 104 and the speaker 404 may mute their volumes.

Figure 5:
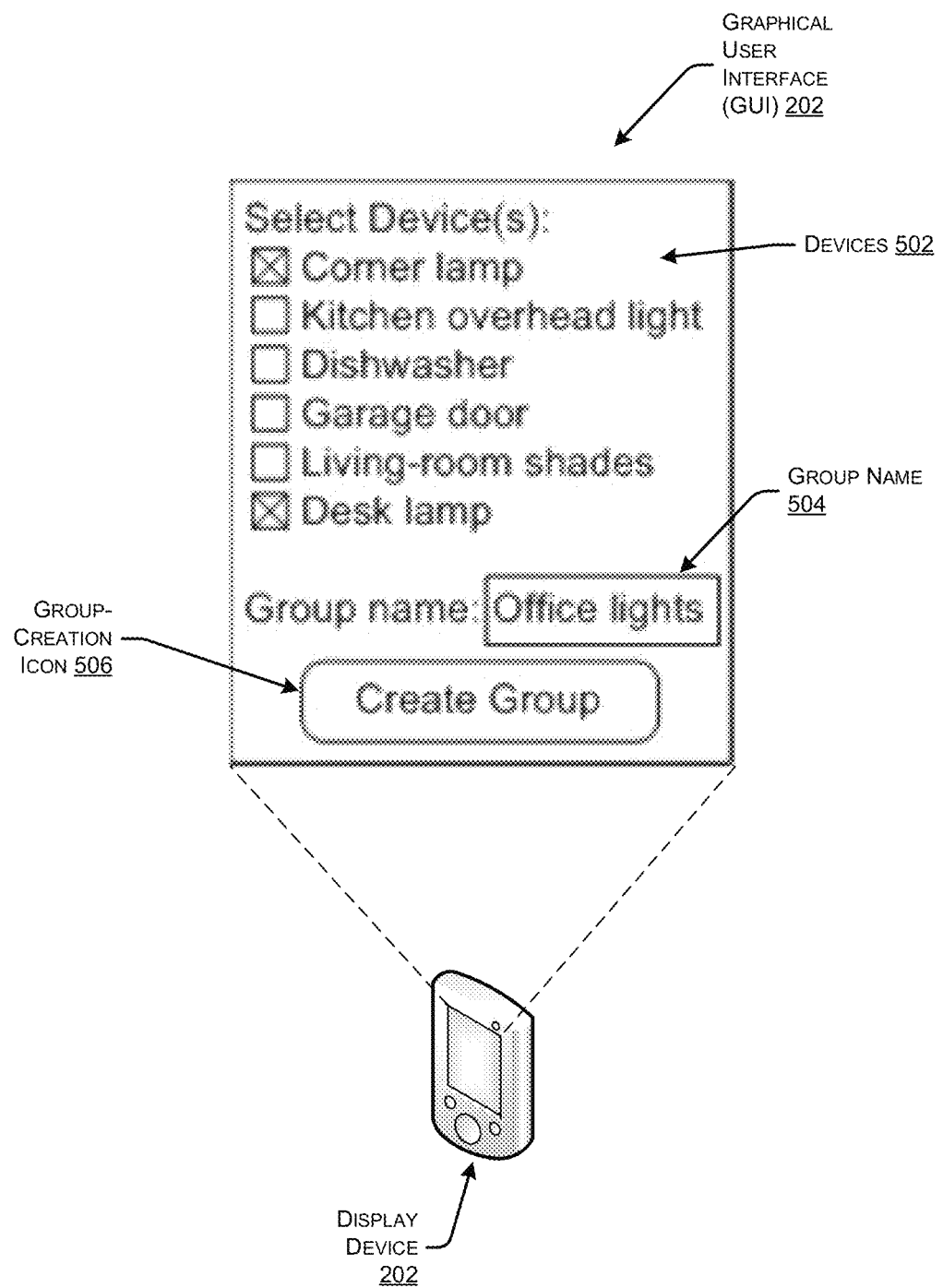
FIG. 5 shows an example GUI that a user may utilize to create a group of devices by specifying which voice-controllable devices are to be part of the group.

FIG. 5 shows the example GUI 202 from FIG. 2 that the user 102 may utilize to create a group of devices by specifying which voice-controllable devices are to be part of the group. As illustrated, the GUI 202 includes a list of devices 502 registered as residing with the environment of the user 102. The GUI 202 also includes checkboxes for allowing the user 102 to select devices to form a part of a group. The GUI further includes an area that allows the user 102 to specify a group name 504 for the devices selected above at 502. The GUI 202 also includes a group-creation icon 506 that, when selected, causes the display device 202 to send the request to create the group to the remote service 112.

Figure 6:
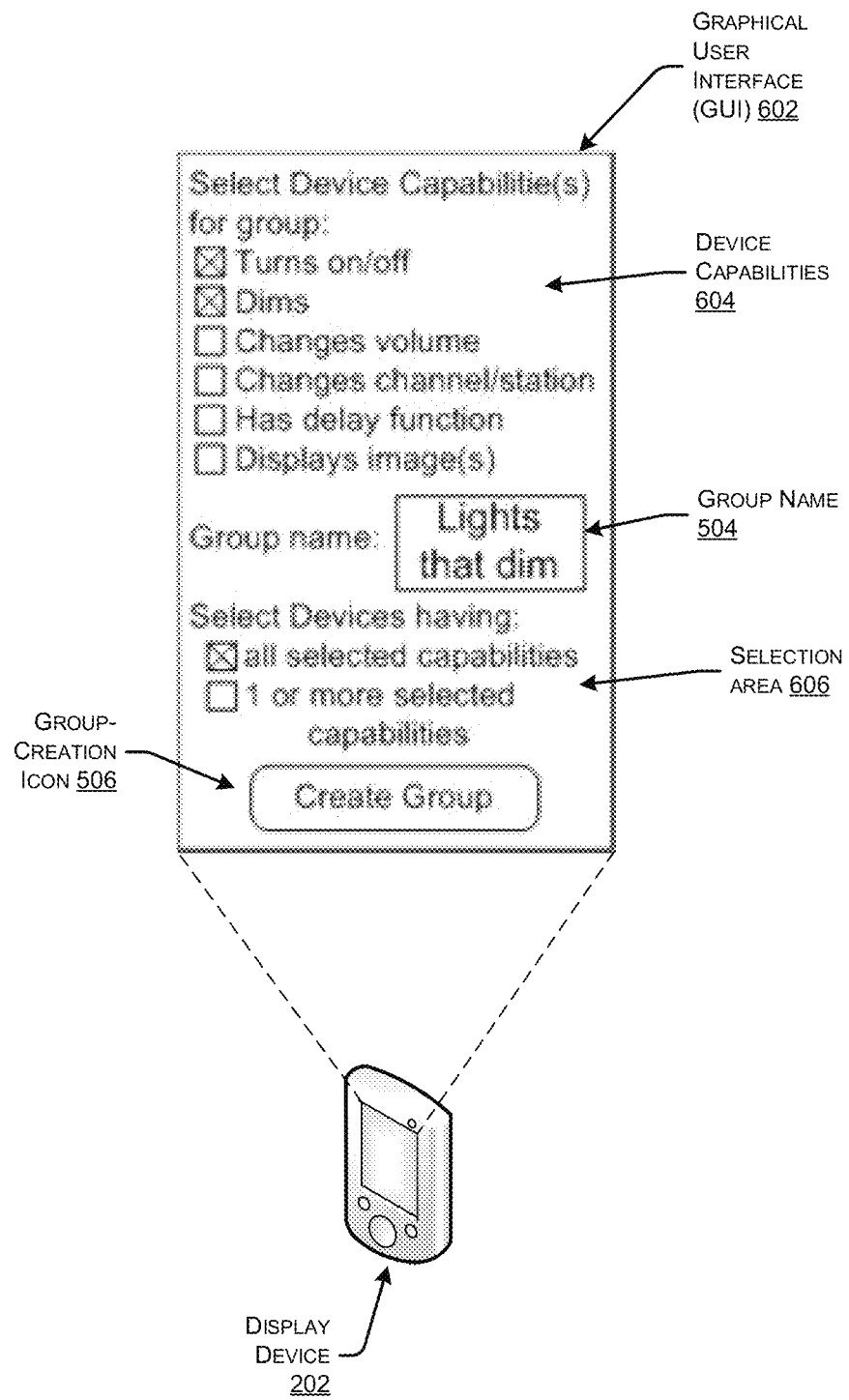
FIG. 6 shows an example GUI that a user may utilize to create a group of devices by specifying one or more device capabilities that devices of the group should have.

FIG. 6 shows an example GUI 602 that a user may utilize to create a group of devices by specifying one or more device capabilities 604 that devices of the group should have. As illustrated, the example GUI 602 includes a list of device capabilities 604 associated with devices residing within the user's environment 100. These example capabilities include the capability to turn on or off, dim, change a volume, change a channel/station, delay a start of the device, and display images. Again, the GUI 602 also includes checkboxes to allow the user to select which capabilities the user would like devices of the group to have. In this example, the user is requesting to create a group of devices from devices having the ability to turn on and off and the ability to dim.

In addition, the GUI 602 includes an area that allows the user 102 to specify a name 504 for the group. In this example, the user 102 has selected the name "Lights that Dim." Furthermore, the GUI 602 includes a selection area 606 that allows a user to indicate whether the created group should include only devices having each specified device capability, those devices having at least one specified device capability, or, in some instances, devices having a certain number of specified device capabilities (e.g., at least 2 selected capabilities). In this example, the user is requesting to create a group of devices from devices that both turn on or off and having the capability to be dimmed. In some instances, the GUI 602 may further allow the user 102 to specify one or more other characteristics of the devices, such as location, device type, or the like. For instance, the user may request that the group only included secondary devices labeled as "lights" (to avoid, for instance, inclusion of a television the example group), and may indicate that the group should only include devices having been designated as residing "upstairs", "in the kitchen", or the like.

Figure 7:
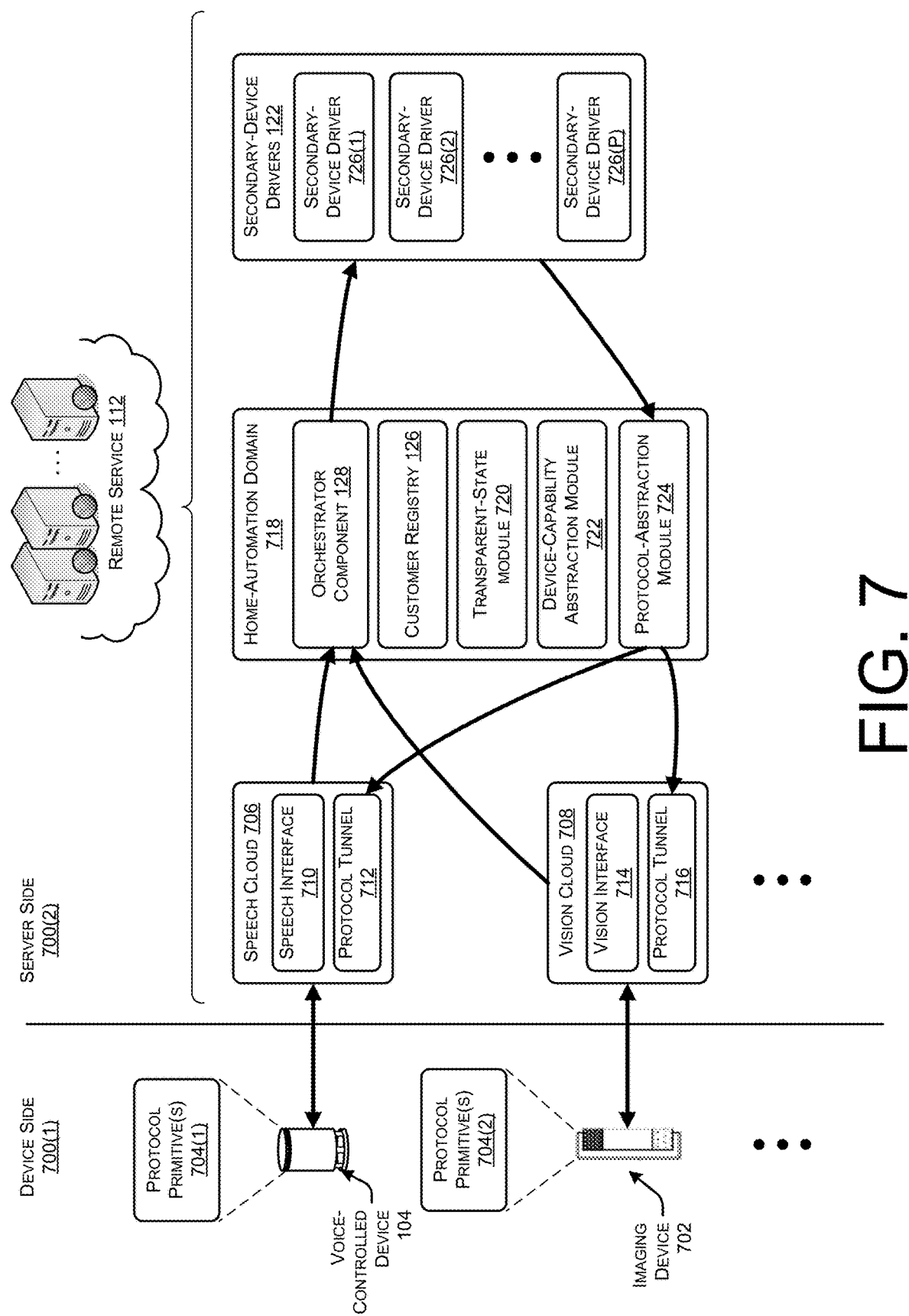
FIG. 7 illustrates example components of the remote service of FIG. 1 for creating groups of devices and causing the devices to perform requested operations.

FIG. 7 illustrates example components of user devices configured to interact with secondary devices, as well as example components of the remote service 112. As illustrated, FIG. 7 is split into a device-side 700(1), corresponding to user environments, and a server-side 700(2), corresponding to the remote service 112. The device-side 700(1) may include one or more devices configured to requests from users to create groups from and perform operations to secondary devices in the user environments, interact with the remote service 112 for receiving remotely-generated commands to cause performance of these operations, and send these commands to the secondary devices to cause performance of the operations. FIG. 7, for instance, illustrates that the device-side 700(1) may include the voice-controlled device 104 and an imaging device 702, amongst other possible user devices configured to receive user requests. The imaging device 702 may represent a device that includes one or more cameras and may be configured to identify user gestures from images captured by these cameras. These user gestures may, in turn, be interpreted as requests to create device groups, requests to perform operations on secondary devices, or the like.

As illustrated, the voice-controlled device 104 may include a first set of protocol primitives 704(1) enabling communication with secondary devices over a first set of communication protocols, while the imaging device 702 may include a second set of protocol primitives 704(2) enabling communication with secondary devices over a second set of communication protocols.

FIG. 7 further illustrates that the different user devices may communicate with different portions of the remote service 112. For instance, the voice-controlled device 104 may communicate with a speech cloud 706, while the imaging device 702 may communicate with a vision cloud 708. The speech cloud 706 may include a speech interface 710 and a protocol tunnel 712. The speech interface 710 may comprise one or more components configured to receive audio signals generated by the voice-controlled device 104 and perform ASR on the audio signals to identify user commands. After identifying a command from an audio signal, the speech interface 710 may route the request to the appropriate domain at the remote-service. For instance, if a user issues a request to play a certain type of music on the voice-controlled device 104, the speech interface 710 may route the request to a "music domain". If the user issues a request to purchase an item (e.g., more orange juice), the speech interface 710 may route the request to a "shopping domain". In this instance, when the speech interface 710 determines that the user has issued a request to create a group of secondary devices or a request to cause a secondary device within the environment of the user to perform a certain operation, the speech interface 710 may route the request to a "home-automation domain 718".

The vision cloud 708, meanwhile, may include a vision interface 714 and a protocol tunnel 716. Again, the vision interface 714 may function to identify requests of the user made via user gestures and route the requests to the appropriate domain. Again, in response to identifying the user performing a gesture related to control of a secondary device, the vision interface 714 may route the request to the home-automation domain 718.

The home-automation domain 718 may include the orchestration component 128, the customer registry 126, a transparent-state module 720, a device-capability abstraction module 722, and a protocol-abstraction module 724. The orchestration component 128 may function to route a user's request to the appropriate location within the remote service 112. For instance, the orchestration component 128 may initially receive an indication that a user has orally requested to create a group of devices, with the request specifying the name of the group and the devices to include in the group. As such, the orchestration component may use information regarding the identity of the voice-controlled device 104 and/or the user 102, along with the verbal description of the secondary devices to identify the secondary devices to include in the group. Here, the orchestration component 126 may reference the customer registry 126, which may store indications of secondary devices and groups of secondary devices registered with respective user accounts. For instance, when users such as the user 102 initially obtain a secondary device, the respective user may register the secondary device with the remote service 112. For instance, the user 102 may provide an indication to the remote service 112 that the user 102 has obtained a remotely controllable desk lamp, which the user is to call "desk lamp". As part of this registration process, the customer registry 126 may store an indication of the name of the secondary device, along with an IP address associated with the secondary device, a MAC address of the secondary device, or the like.

The transparent-state module 720, meanwhile, may maintain a current state of secondary devices referenced in the customer registry. For instance, the module 720 may keep track of whether the desk lamp is currently on or off. The device-capability abstraction module 722 module, meanwhile, may function to identify and store indications of device capabilities of respective secondary devices. For instance, the device-capability abstraction module 722 may initially be programmed to store a set of predefined device capabilities provided by secondary devices available for acquisition by users. Thereafter, each time a user registers a new device with the customer registry 126, the device-capability abstraction module 722 may map the capabilities of the new device to the set of predefined device capabilities. By doing so, when a user requests to create a group consisting of devices capable of being dimmed, or requests to turn off all lights capable of being dimmed, the orchestration component 128 is able to identify which devices have this particular capability.

Finally, the protocol-abstraction module 724 functions to create a tunnel from a secondary-device driver located remotely from a user's environment back to the user environment, as discussed immediately below.

After identifying the addressable secondary device that the user has referenced in a request, the orchestration component 128 may identify the type of the secondary device for the purpose of determining the secondary-device driver used to generate commands for the secondary device. As illustrated, the remote service 112 may further store the secondary-device drivers 122, which may comprise one or more secondary-device drivers 726(1), 726(2), . . . , 726(P) for communicating with an array of secondary devices. After identifying the appropriate driver, the orchestration component 128 may route the request to turn on the desk lamp to the appropriate driver, which may in turn generate the appropriate command. Thereafter, the driver may provide the command back to the device that initially provided the request via the appropriate tunnel. For instance, if the voice-controlled device 104 initially provided the request, the secondary-device driver may provide the command through the protocol-abstraction module 724, which in turn creates the protocol tunnel 712 in the speech cloud 706, which in turn passes the command back to the voice-controlled device 104. The device 104 may then issue the command via the appropriate protocol via the protocol primitives 704(1). For commands that are destined for the imaging device 702, the generated command may be routed to the device 702 via the protocol-abstraction module 724 and the protocol tunnel 716.

Figure 8:
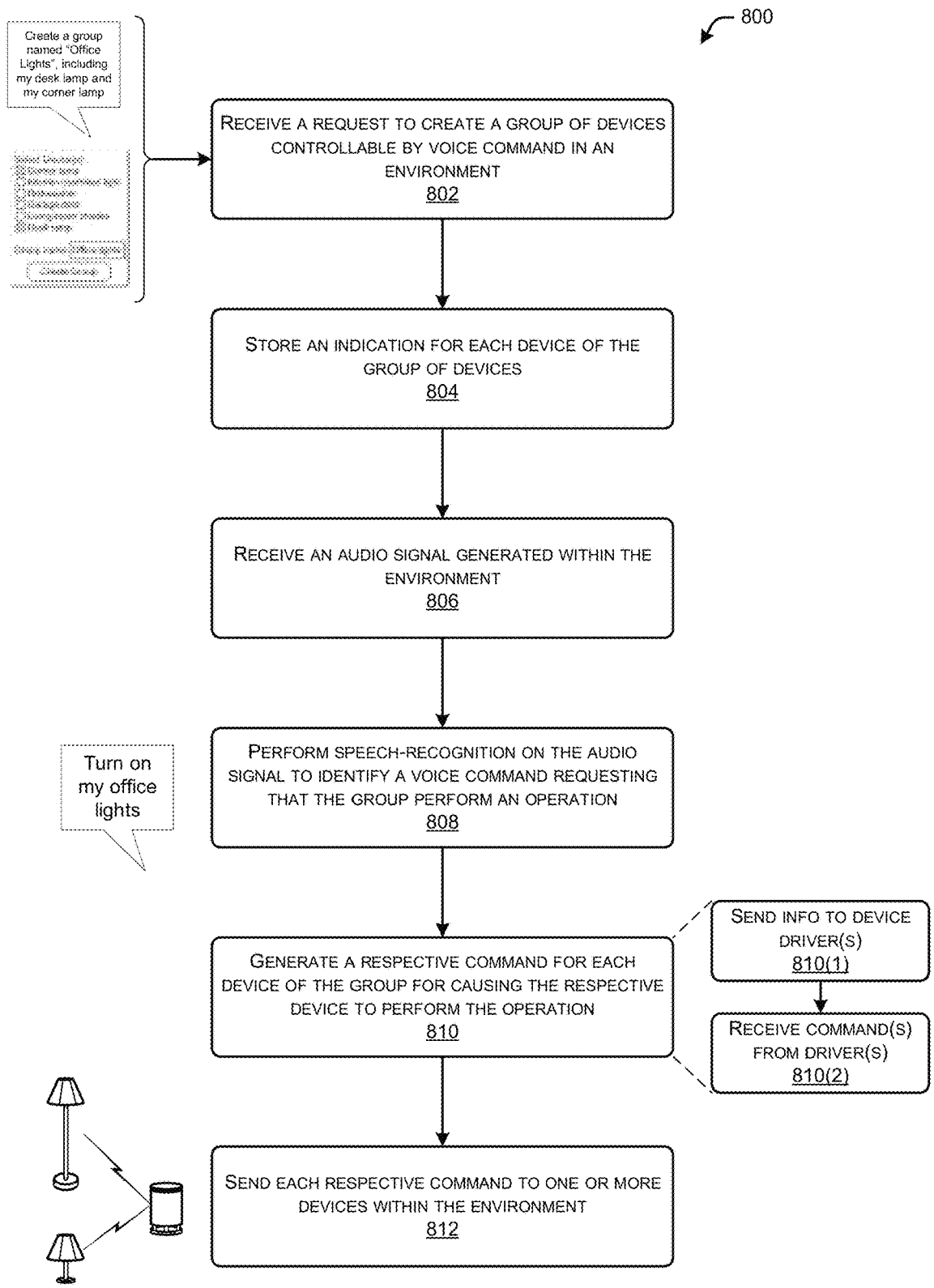
FIG. 8 is a flow diagram of an example process for creating a group of devices and controlling the group via voice commands thereafter.

FIG. 8 is a flow diagram of an example process 800 for creating a group of devices and controlling the group via voice commands thereafter. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 802, the process 800 receives a request to create a group of devices controllable by voice command within an environment. This request may comprise an oral request made via voice command, or a request made via a GUI. At 804, the process 800 associates each respective device with the group by storing an indication for each device that the respective device is part of the group. For instance, the customer registry 126 may store an indication that a particular named group includes one or more particular devices of a user. At 806, the process 800 receives an audio signal generated within the environment. This audio signal may include a voice command of a user requesting to perform an operation to a group of devices. At 808, the process performs speech-recognition on the audio signal to identify the voice command of the user. In some instances, the process 800 may implement a cascading approach when identifying the voice command. For instance, the process 800 may first determine whether or not the audio signal represents a voice command that references a group. If so, then the process 800 may perform the requested operation on the group, as discussed below. If, however, no group is identified, then the process 800 may determine whether the audio signal references an individual device. Of course, while this example describes first determining whether a group is referenced in the audio signal before determining whether a device is mentioned, in other instances the process 800 may reverse this order. Furthermore, in some instances, when the process 800 determines that a user has requested to perform an operation upon a group, the process 800 may verify that each device of the group is capable of performing the requested operation. If not, the process 800 may perform the operation for those devices of the group that are capable of doing so, may output a notification to the user indicating that one or more devices of the group are not able to perform the operation, or the like.

At 810, the process 800 generates a respective command for each device of the group for causing the respective device to perform the requested operation. This may include first sending information indicative of the request to each device driver associated with a device of the group at 810(1), and receiving, at 810(2), a respective command from each device driver for causing a respective device to perform the requested operation. At 812, the process 800 sends each respective command to one or more devices within the environment for sending to the devices of the group. In some instances, this may include sending each generated command to the voice-controlled device that initially received the request from the user to perform the operation on the group, which in turn passes these commands via the appropriate protocols to the respective devices. In other instances, meanwhile, the secondary-device drivers that generate the commands may send the commands to the secondary devices via any other channel, as discussed above.

Figure 9:
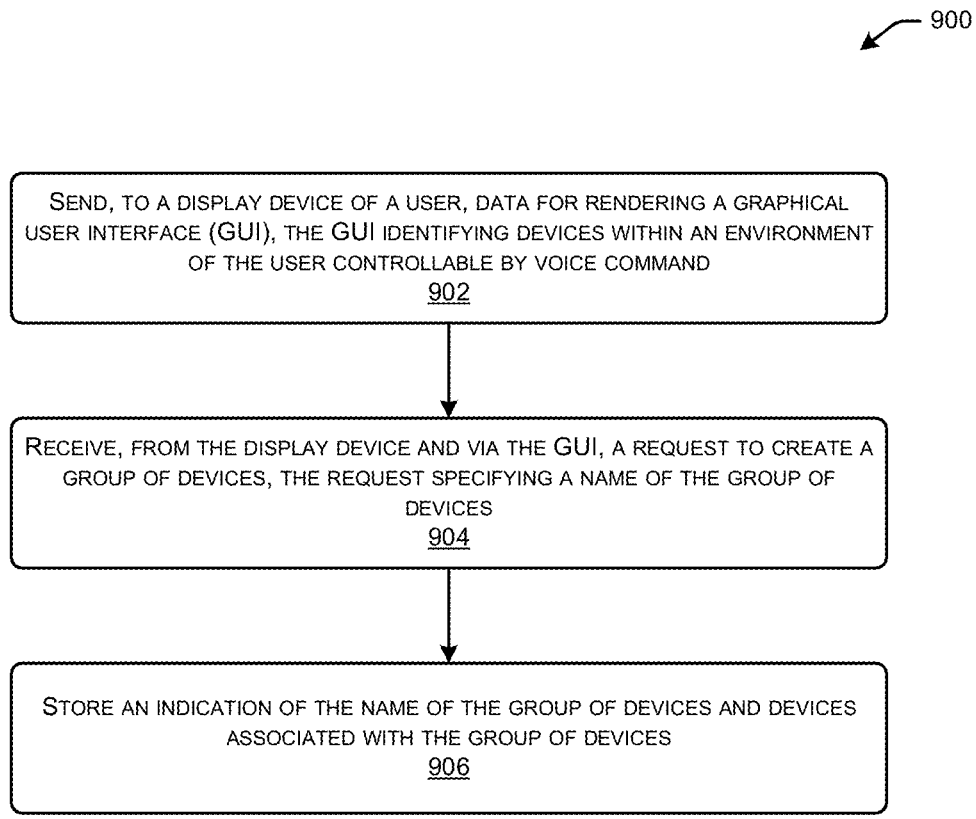
FIG. 9 is a flow diagram of an example process for providing a GUI to a display device of a user to allow the user to issue a request to create a group of voice-controllable devices.

FIG. 9 is a flow diagram of an example process 900 for providing a GUI to a display device of a user to allow the user to issue a request to create a group of voice-controllable devices. At 902, the process 900 sends, to a display device of a user, data for rendering a graphical user interface (GUI), the GUI identifying devices within an environment of the user that are controllable via voice command. In some instances, the GUI may additionally or alternatively identify capabilities of devices residing within the environment of the user, from which the user may request to create device group from devices that include the selected capabilities, as discussed above with reference to FIG. 6.

At 904, the process 900 receives, from the display device and via the GUI, a request to create a group of devices controllable by voice command, the request specifying a name for the group of device. At 906, the process 900 associates the devices with the group by storing an indication of the name of the group of devices and devices associated with the group of devices. By doing so, the user may be able to issue voice commands that request that a particular group of devices perform specified operations.

Figure 10:
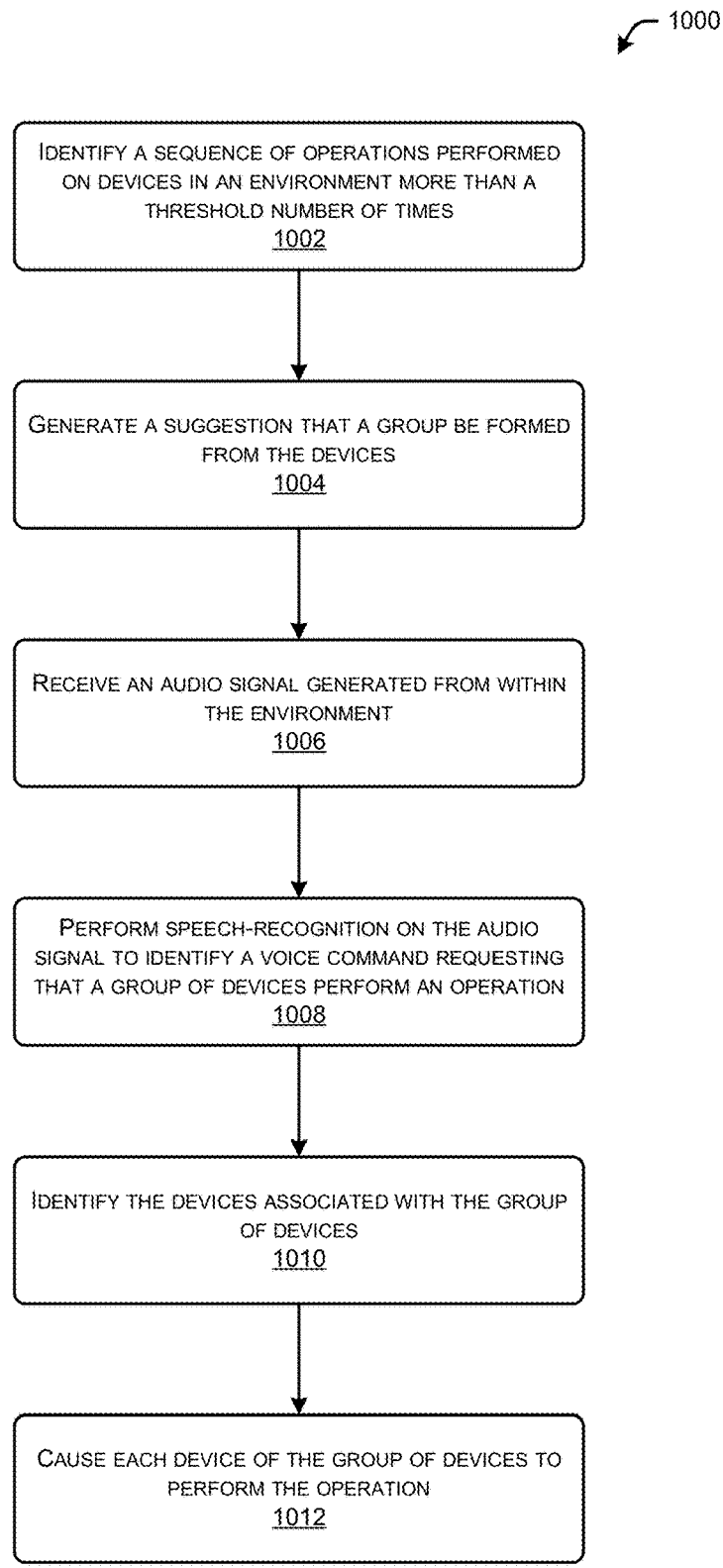
FIG. 10 is a flow diagram of an example process for generating a suggestion that a user create a certain group of devices and, thereafter, allowing the user to control a created group of devices via voice commands.

FIG. 10 is a flow diagram of an example process 1000 for generating a suggestion that a user request that a certain group of devices be created and, thereafter, allowing the user to issue voice commands to one or more devices that, in turn, control a created group of devices via voice commands. At 1002, the process 1000 identifies a sequence of operations performed on devices within an environment more than a threshold number of times. That is, the process 100 may determine that the user 102 often turns on the desk lamp 106(1) before immediately turning on the corner lamp 106(2). For example, the remote service 112 may make this determination based on the transparent-state module 710 storing indications of when the desk lamp and the corner lamp transition from the OFF state to the ON state and determining that these two devices do so more than a threshold number of times.

After making this identification or determination, at 1004 the process 1000 generates a suggestion that the user associated with the environment create a group of devices that includes the devices associated with the common sequence of operations. The process 1000 may output this suggestion audibly (e.g., over the voice-controlled device 104), visually (e.g., via the GUI 202), or in any other manner. The user may issue a request to create the suggested group and/or may issue a request to modify devices associated with the suggested group.

At 1006, and sometime after the user has requested to create a group of devices, the process 1000 receives an audio signal that was generated within the environment of the user. At 1008, the process 1000 performs speech-recognition on the audio signal to identify a voice command requesting that a group of devices perform a specified operation. At 1010, the process 1000 identifies the devices of the group of the devices and, at 1012, causes each device of the group of devices to perform the operation.

Figure 11:
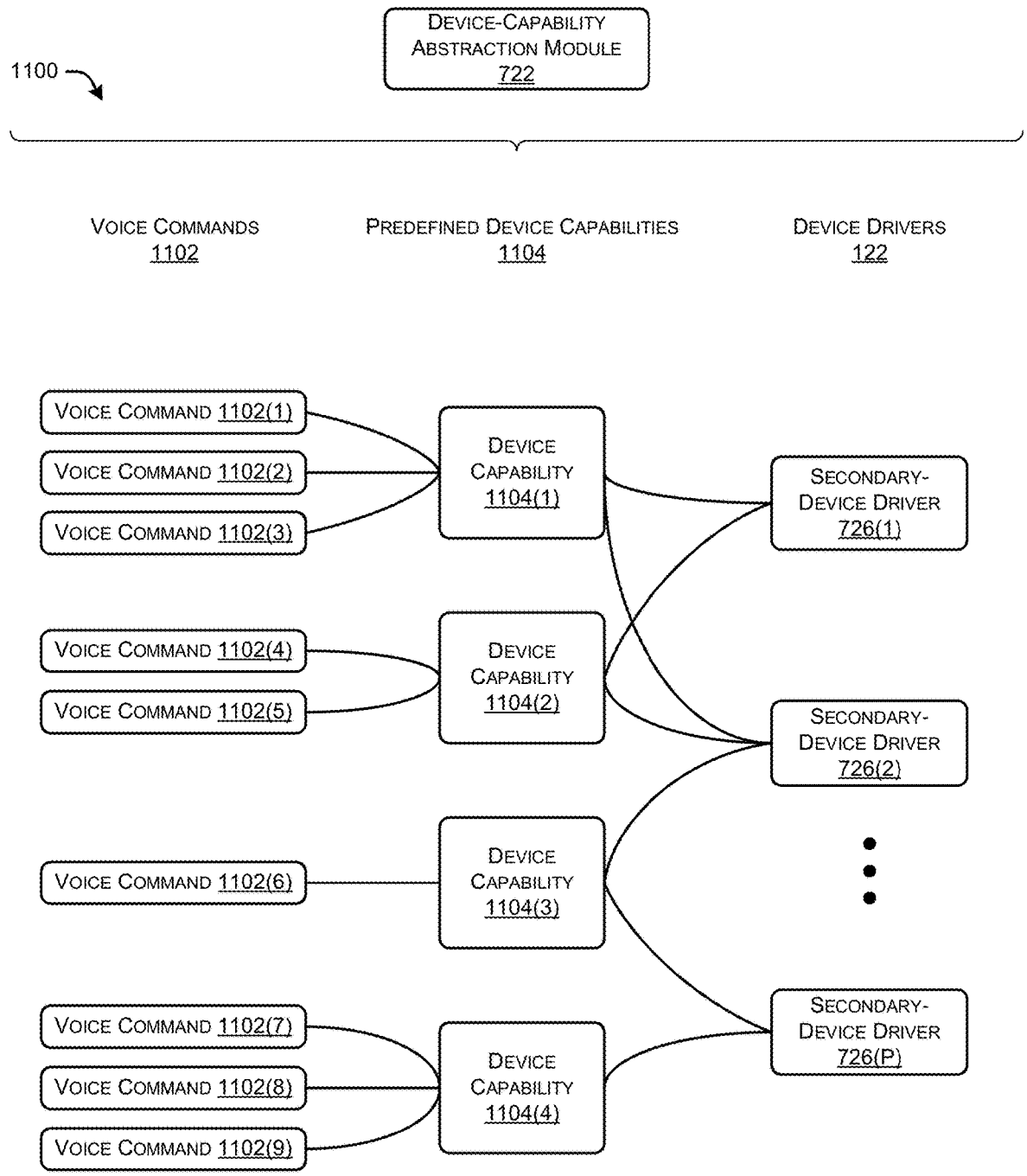
FIG. 11 illustrates an example mapping stored between voice commands, device capabilities, and device drivers. When a user adds a new device to the customer registry, the device-capability abstraction component may map the capabilities of the new device to a set of predefined device capabilities, and may also map voice commands and a driver for the new device to the capabilities of the new device.

FIG. 11 illustrates an example mapping 1100 stored between voice commands, device capabilities, and device drivers. When a user adds a new device to the customer registry 126, the device-capability abstraction module 722 may map the capabilities of the new device to a set of predefined device capabilities, and may also map voice commands and a driver for the new device to the capabilities of the new device.

To illustrate, FIG. 11 is shown to include four example predefined device capabilities 1102(1), 1102(2), 1102(3), and 1102(4). These device capabilities may represent capabilities such as turn on/off, change a volume, change a temperature, change a brightness, or the like. In some instances, each represented device capability may be associated with a capability type, such as binary control (e.g., ability to turn on or off, open or close, lock or unlock), gradient control (e.g., ability to change between high and low or less and more), setting adjustment (e.g., ability to change to a particular value), and relative control (e.g., ability to increase or decrease a value).

When a user registers a new device within their environment with the customer registry 126, the device-capability abstraction module 722 may initially determine the capabilities of the new device and may map these capabilities one or more of the predefined capabilities. For instance, the device-capability abstraction module 722 may store an indication that a particular device is able to turn on/off, change a brightness (i.e., dim), and change a color, such as in the example of a "smart light bulb". In addition to mapping the capabilities of the new device to the predefined device capabilities, the device-capability abstraction module 722 may also store an indication of one or more voice commands that, when uttered, cause the new device to perform each respective predefined device capability.

For instance, using the example of a dimming device capability, the device-capability abstraction module 722 may store an indication that a device will perform this operation/capability upon a user requesting to "dim my <device>", "turn down the amount of light from my <device/group>", "brighten my <device/group>" of the like. As such, each predefined device capability may be associated with one or more voice commands, as FIG. 11 illustrates.

Furthermore, the example mapping 1100 may change as new secondary devices and corresponding capabilities are created. For instance, if a third-party manufacturer creates a secondary device having a capability that is not currently represented in the predefined device capabilities 1104, the third-party or another device may request to create an indication of this new device capability. In response, the device-capability abstraction module 722 may add the device capability to the mapping 1100, such that the new secondary device and other forthcoming secondary devices may be associated with the added device capability.

Similarly, in some instances end users may request that certain device capabilities be added to the mapping 1100 (e.g., such that that the users may create groups having a certain device capability or otherwise control devices via a certain device capability). In some instances, a device-capability abstraction module 722 may add a requested capability to the mapping 1100 after a threshold number of users request that the capability be added. In addition, in instances where a user references a device capability that is not recognized by the system, the user's request may be routed to a machine learning algorithm for aggregating with other unknown user requests for use in determining whether a new capability should be added to the mapping 1100.

In addition, the device-capability abstraction module 722 may store indications of which device-drivers are configured to work with which devices. Therefore, when a user says "please dim my desk lamp", the orchestration component 128 may utilizing the mapping 1100 created by the device-capability abstraction module 722 to map this voice command to a predefined device capability (dimming) and, thereafter, to a device driver associated with the desk lamp for generating a command for causing the desk lamp to dim. In some instances, a device driver may interact with multiple secondary devices. Similarly, some secondary devices may be controlled by multiple device drivers.

Figure 12:
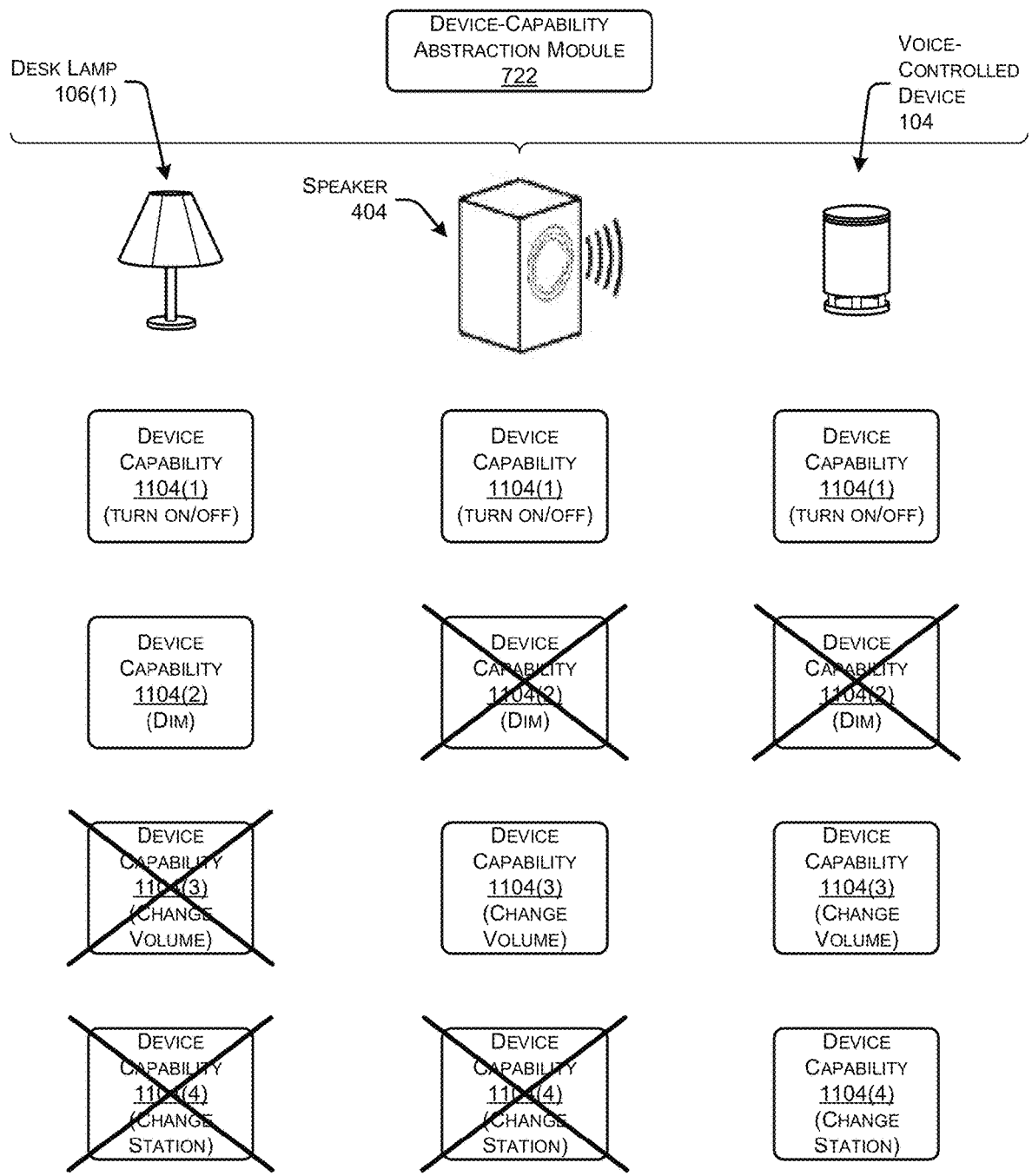
FIG. 12 illustrates an example where the device-capability abstraction component determines which predefined device capabilities each of three examples devices include. For instance, the illustrated light may have the capability to "turn on and off" and "dim", but might not have the capability to "change its volume" or "change a channel or station".

FIG. 12 illustrates an example where the device-capability abstraction component determines which predefined device capabilities each of three examples devices include. In this example, the predefined device capability 1102(1) represents the ability for a device to turn on or off, the predefined device capability 1102(2) represents the ability for a device to dim, the predefined device capability 1102(3) represents the ability for a device to change its volume, and the predefined device capability 1102(4) represents the ability for a device to change a change/station.

To provide an example, FIG. 12 illustrates that the device-capability abstraction module 722 stores an indication the desk lamp 106(1) is associated with the device capabilities of "turning off/on" and "dimming", but not "changing volume" or "changing a channel/station". In addition, the device-capability abstraction module 722 stores an indication the speaker 404 is associated with the device capabilities of "turning off/on" and "changing volume", but not "dimming" or "changing a channel/station". Finally, the device-capability abstraction module 722 stores an indication the voice-controlled device 104 is associated with the device capabilities of "turning off/on", "changing volume", and "changing a channel/station", but not "dimming".

Figure 13:
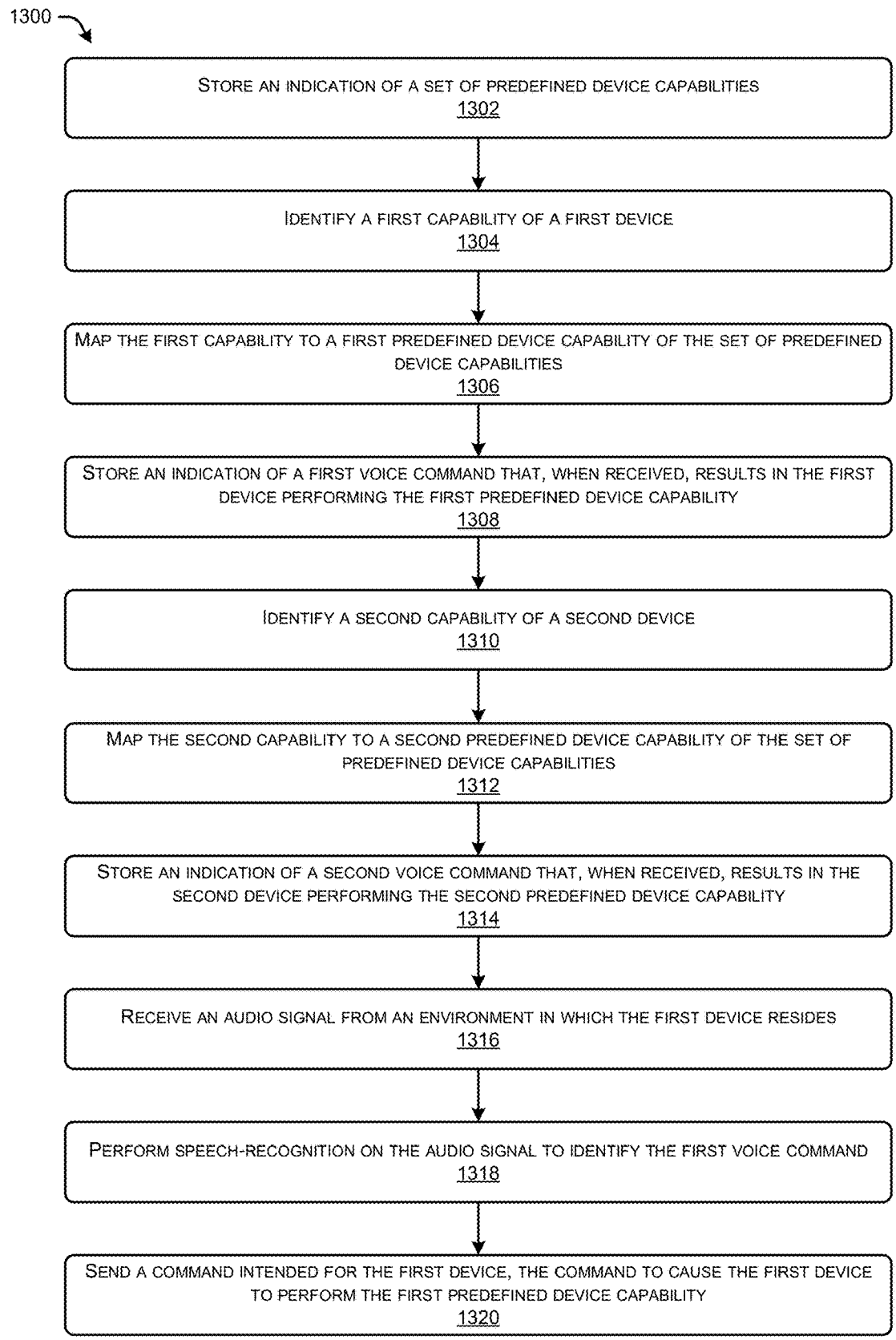
FIG. 13 illustrates an example flow diagram of a process for mapping capabilities of a first device to a set of predefined device capabilities and storing an indications of respective voice commands for causing the first device to perform the respective capabilities (e.g., turn on/off, dim, turn up volume, open/close, etc.). This process also performs the mapping and storing for a second, different device.

FIG. 13 illustrates an example flow diagram of a process 1300 for mapping capabilities of a first device to a set of predefined device capabilities and storing an indications of respective voice commands for causing the first device to perform the respective capabilities (e.g., turn on/off, dim, turn up volume, open/close, etc.). This process also performs the mapping and storing for a second, different device.

At 1302, the process 1300 stores an indication of a set of predefined device capabilities, each representing a capability that one or more devices are configured to perform. As described above, this may include identifying some, most, or all capabilities of "smart appliances" offered to users at any given time. That is, the set of predefined device capabilities may represent the universe or substantially all of the universe of capabilities that devices likely to be registered by users would include.

At 1304, the process 1300 identifies a first capability of a first device. For instance, a user may register a new device with the customer registry 126 and, in response, the device-capability abstraction module 722 may identify a first capability that this device may perform. At 1306, the process 1300 may map this first capability to a first predefined device capability of the set of predefined device capabilities. At 1308, the process 1300 then stores an indication of a first voice command that, when received, results in the first device performing the first predefined device capability.

At 1310, the process 1300 identifies a second capability of a second device. For instance, a user may register yet another new device with the customer registry 126 and, in response, the device-capability abstraction module 722 may identify a second capability that this device may perform. At 1312, the process 1300 may map this second capability to a second predefined device capability of the set of predefined device capabilities. At 1314, the process 1300 then stores an indication of a second voice command that, when received, results in the second device performing the second predefined device capability.

At 1316, the process 1300 receives an audio signal from an environment in which the first device resides and, at 1318, the process 1300 performs speech-recognition on the audio signal to identify the first voice command. At 1320, the process 1300 then sends a command intended for the first device, the command for causing the first device to perform the first predefined device capability. In some instances, in order to generate this command, the process 1300 identifies an appropriate device driver configured to generate commands that are executable by the first device.

Figure 14:
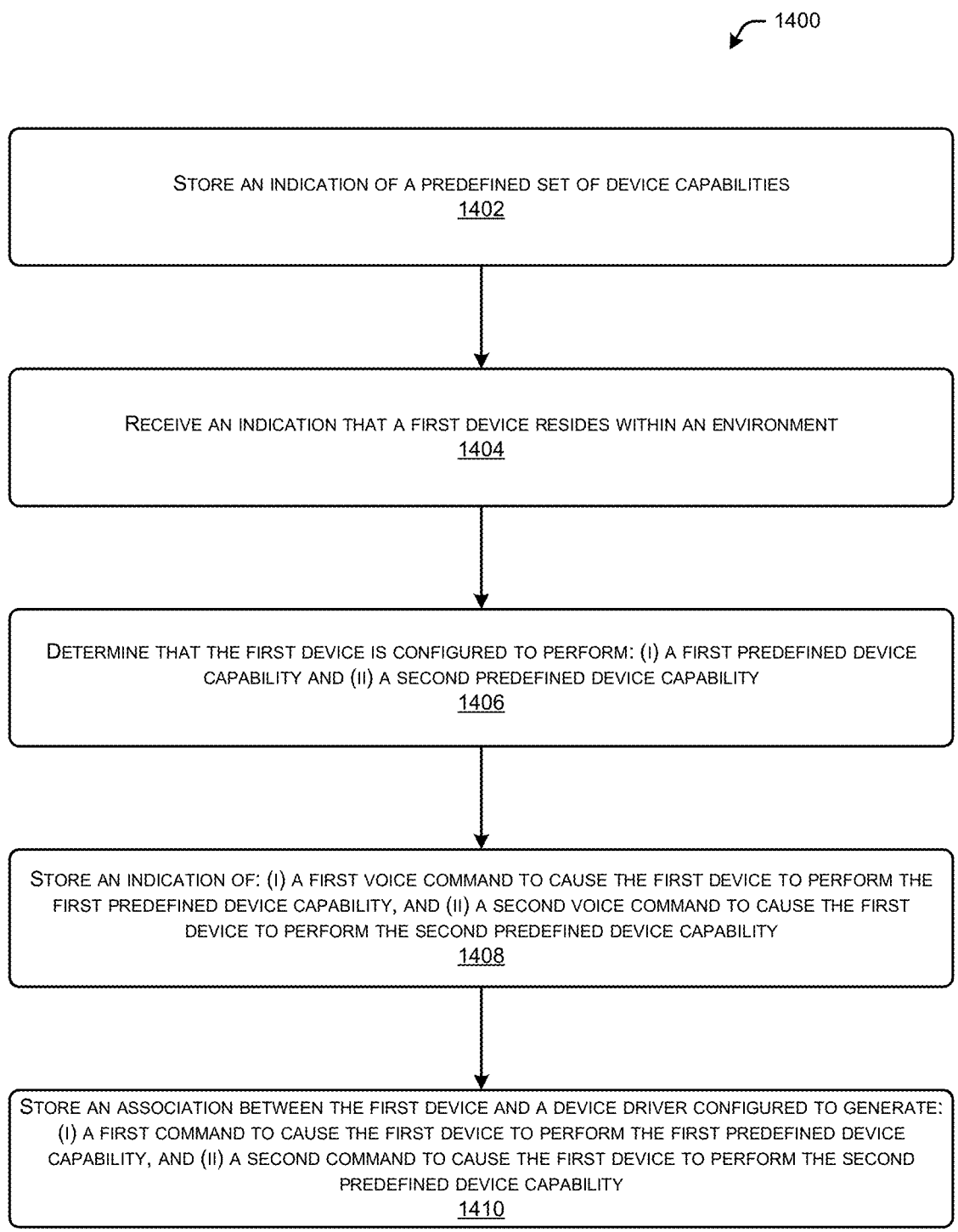
FIG. 14 illustrates a flow diagram of a process for mapping capabilities of a device into a predefined set of device capabilities and identifying voice commands for causing the device to perform the respective capabilities.

FIG. 14 illustrates a flow diagram of a process 1400 for mapping capabilities of a device into a predefined set of device capabilities and identifying voice commands for causing the device to perform the respective capabilities. At 1402, the process 1400 stores an indication of a set of predefined device capabilities, as described above. At 1404, the process 1400 receives an indication that a first device resides within an environment. For instance, a user may attempt to register the device with the customer registry 126. At 1406, the process 1400 determines that the first device is configured to perform: (i) a first predefined device capability of the set of predefined device capabilities, and (ii) a second predefined device capability of the set of predefined device capabilities. At 1408, the process 1400 stores an indication of: (i) a first voice command that, when uttered within the environment, is to result in the first device performing the first predefined device capability, and (ii) a second voice command that, when uttered within the environment, is to result in the first device performing the second predefined device capability. By doing so, the process 1400 now ensures that the appropriate voice commands will map to the appropriate predefined device capabilities. Finally, at 1410, the process 1400 stores an association between the first device and a device driver configured to generate: (i) a first command to cause the first device to perform the first predefined device capability, and (ii) a second command to cause the first device to perform the second predefined device capability. At this point, the process 1400 now also ensures that the appropriate device driver will be utilized when a user issues a voice command instructing the first device to perform the first or second predefined device capability.

Figure 15:
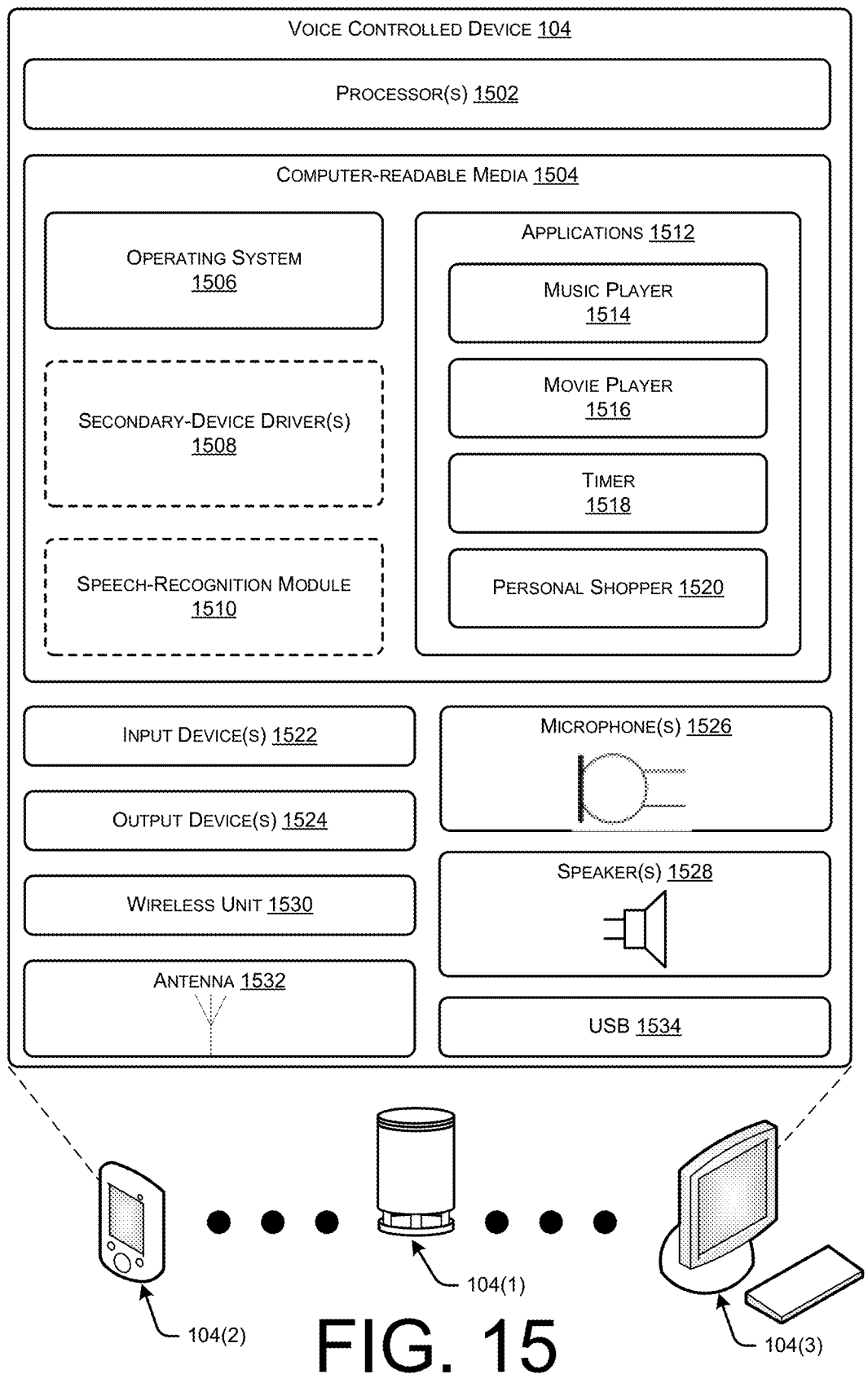
FIG. 15 shows a functional block diagram of selected components implemented at a user device, such as the voice-controlled device of FIG. 1.

FIG. 15 shows selected functional components of a natural language input controlled device, such as the voice-controlled device 104. The voice-controlled device 104 may be implemented as a standalone device 104(1) that is relatively simple in terms of functional capabilities with limited input/output components, memory, and processing capabilities. For instance, the voice-controlled device 104(1) does not have a keyboard, keypad, or other form of mechanical input. Nor does it have a display (other than simple lights, for instance) or touch screen to facilitate visual presentation and user touch input. Instead, the device 104(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 104(1) is through voice input and audible output. In some instances, the device 104(1) may simply comprise a microphone, a power source (e.g., a battery), and functionality for sending generated audio signals to another device.

The voice-controlled device 104 may also be implemented as a mobile device 104(2) such as a smart phone or personal digital assistant. The mobile device 104(2) may include a touch-sensitive display screen and various buttons for providing input as well as additional functionality such as the ability to send and receive telephone calls. Alternative implementations of the voice-controlled device 104 may also include configuration as a personal computer 104(3). The personal computer 104(3) may include a keyboard, a mouse, a display screen, and any other hardware or functionality that is typically found on a desktop, notebook, netbook, or other personal computing devices. The devices 104(1), 104(2), and 104(3) are merely examples and not intended to be limiting, as the techniques described in this disclosure may be used in essentially any device that has an ability to recognize speech input or other types of natural language input.

In the illustrated implementation, the voice-controlled device 104 includes one or more processors 1502 and computer-readable media 1504. In some implementations, the processors(s) 1502 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1502 may possess its own local memory, which also may store program modules, program data, and/or one or more operating systems.

The computer-readable media 1504 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1504 may be implemented as computer-readable storage media ("CRSM"), which may be any available physical media accessible by the processor(s) 1502 to execute instructions stored on the memory 1504. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1502.

Several modules such as instruction, datastores, and so forth may be stored within the computer-readable media 1504 and configured to execute on the processor(s) 1502. A few example functional modules are shown as applications stored in the computer-readable media 1504 and executed on the processor(s) 1502, although the same functionality may alternatively be implemented in hardware, firmware, or as a system on a chip (SOC).

An operating system module 1506 may be configured to manage hardware and services within and coupled to the device 104 for the benefit of other modules. In addition, in some instances the device 104 may include some or all of one or more secondary-device drivers 1508. In other instances, meanwhile, the device 104 may be free from the drivers 1508 for interacting with secondary devices. The device 104 may further including, in some instances, a speech-recognition module 1510 that employs any number of conventional speech processing techniques such as use of speech recognition, natural language understanding, and extensive lexicons to interpret voice input. In some instances, the speech-recognition module 1510 may simply be programmed to identify the user uttering a predefined word or phrase (i.e., a "wake word"), after which the device 104 may begin uploading audio signals to the remote service 112 for more robust speech-recognition processing. In other examples, the device 104 itself may, for example, identify voice commands from users and may provide indications of these commands to the remote service 112.

The voice-controlled device 104 may also include a plurality of applications 1512 stored in the computer-readable media 1504 or otherwise accessible to the device 104. In this implementation, the applications 1512 are a music player 1514, a movie player 1516, a timer 1518, and a personal shopper 1520. However, the voice-controlled device 104 may include any number or type of applications and is not limited to the specific examples shown here. The music player 1514 may be configured to play songs or other audio files. The movie player 1516 may be configured to play movies or other audio visual media. The timer 1518 may be configured to provide the functions of a simple timing device and clock. The personal shopper 1520 may be configured to assist a user in purchasing items from web-based merchants.

Generally, the voice-controlled device 104 has input devices 1522 and output devices 1524. The input devices 1522 may include a keyboard, keypad, mouse, touch screen, joystick, control buttons, etc. In some implementations, one or more microphones 1526 may function as input devices 1522 to receive audio input, such as user voice input. The output devices 1524 may include a display, a light element (e.g., LED), a vibrator to create haptic sensations, or the like. In some implementations, one or more speakers 1528 may function as output devices 1524 to output audio sounds.

A user 102 may interact with the voice-controlled device 104 by speaking to it, and the one or more microphone(s) 1526 captures the user's speech. The voice-controlled device 104 can communicate back to the user by emitting audible statements through the speaker 1528. In this manner, the user 102 can interact with the voice-controlled device 104 solely through speech, without use of a keyboard or display.

The voice-controlled device 104 may further include a wireless unit 1530 coupled to an antenna 1532 to facilitate a wireless connection to a network. The wireless unit 1530 may implement one or more of various wireless technologies, such as Wi-Fi, Bluetooth, RF, and so on. A USB port 1534 may further be provided as part of the device 104 to facilitate a wired connection to a network, or a plug-in network device that communicates with other wireless networks. In addition to the USB port 1534, or as an alternative thereto, other forms of wired connections may be employed, such as a broadband connection.

Accordingly, when implemented as the primarily-voice-operated device 104(1), there may be no input devices, such as navigation buttons, keypads, joysticks, keyboards, touch screens, and the like other than the microphone(s) 1526. Further, there may be no output such as a display for text or graphical output. The speaker(s) 1528 may be the main output device. In one implementation, the voice-controlled device 104(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 104(1) may be implemented as an aesthetically appealing device with smooth and rounded surfaces, with one or more apertures for passage of sound waves. The device 104(1) may merely have a power cord and optionally a wired interface (e.g., broadband, USB, etc.). As a result, the device 104(1) may be generally produced at a low cost. Once plugged in, the device may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   receiving, from a first device, an audio signal representing sound in an environment;
   performing speech-recognition on the audio signal;
   identifying, based at least in part on the performing of the speech-recognition, a request associated with a group of devices that is associated with a user account;
   identifying one or more devices, configured to perform one or more operations, that are part of the group of devices;
   associating a second device with the user account;
   identifying that the second device includes a capability to perform the one or more operations;
   determining, based at least in part on identifying that the second device includes the capability, an updated group of devices by adding the second device to the group of devices; and
   causing at least one of the one or more devices and the second device to perform an operation identified from the request.

2. The method as recited in claim 1, further comprising:
   receiving a request to form the group of devices;
   identifying one or more devices based on the request to form the group of devices; and
   storing an indication that the one or more devices are associated with the group of devices.

3. The method as recited in claim 2, wherein the request to form the group of devices is received via user selection on a graphical user interface (GUI), the GUI including an option to request to form the group of devices by identifying at least one of the one or more devices or one or more device capabilities.

4. The method as recited in claim 1, further comprising:
   receiving, from the first device, a second audio signal; and
   performing speech-recognition on the second audio signal to identify a request to form the group of devices.

5. The method as recited in claim 1, wherein identifying the one or more devices comprises identifying that the one or more devices include one or more device capabilities.

6. The method as recited in claim 1, further comprising:
   identifying a sequence of operations performed by devices within the environment more than a threshold number of times; and
   generating a suggestion that a group be formed from the devices associated with the sequence of operations.

7. The method as recited in claim 1, further comprising:
   determining that a user is in the environment; and
   causing at least one of the one or more devices and the second device to perform the operation identified from the request based at least in part on the determining that the user is in the environment.

8. The method as recited in claim 7, wherein determining that the user is in the environment comprises analyzing motion data received from a motion sensor to determine that the user is in the environment.

9. The method as recited in claim 1, wherein identifying the one or more devices is based at least in part on a name associated with the group of devices that is identified from the request.

10. A system, comprising:
one or more processors; and
one or more computer-readable media storing computer-executable instructions that, when executed, cause the one or more processors to perform acts comprising:
performing speech-recognition on an audio signal, the audio signal representing sound in an environment;
identifying, based at least in part on the performing of the speech-recognition, a request associated with a group of devices;
identifying one or more devices, configured to perform one or more operations, that are part of the group of devices associated with a user account;
associating a first device with the user account;
identifying that the first device includes a capability to perform the one or more operations;
determining, based at least in part on identifying that the first device includes the capability, an updated group of devices by adding the first device to the group of devices; and
causing at least one of the one or more devices and the first device to perform an operation identified from the request.

11. The system as recited in claim 10, the acts further comprising receiving the audio signal from an input device in the environment.

12. The system as recited in claim 10, the acts further comprising:
receiving a request to form the group of devices;
identifying one or more devices based on the request to form the group of devices; and
storing an indication that the one or more devices are associated with the group of devices.

13. The system as recited in claim 12, wherein the request to form the group of devices is received via user selection on a graphical user interface (GUI), the GUI including an option to request to form the group of devices by identifying at least one of the one or more devices or one or more device capabilities.

14. The system as recited in claim 10, the acts further comprising performing speech-recognition on a second audio signal to identify a request to form the group of devices.

15. The system as recited in claim 10, wherein identifying the one or more devices comprises identifying that the one or more devices include one or more device capabilities.

16. The system as recited in claim 10, the acts further comprising:
identifying a sequence of operations performed by devices within the environment more than a threshold number of times; and
generating a suggestion that a group be formed from the devices associated with the sequence of operations.

17. The system as recited in claim 10, wherein the audio signal was uttered by a user, the acts further comprising:
analyzing motion data received from a motion sensor to determine that the user is in the environment; and
causing at least one of the one or more devices and the first device to perform the operation identified from the request based at least in part on the determining that the user is in the environment.

18. The system as recited in claim 10, wherein identifying the one or more devices is based at least in part on a name associated with the group of devices that is identified from the request.

\* \* \* \* \*